US012689463B2

(12) United States Patent
Yao et al.

(10) Patent No.: US 12,689,463 B2
(45) Date of Patent: Jul. 21, 2026

(54) INFORMATION TRANSMISSION METHOD AND APPARATUS, INFORMATION RECEPTION METHOD AND APPARATUS, TERMINAL, AND NETWORK-SIDE DEVICE

(71) Applicant: VIVO MOBILE COMMUNICATION CO., LTD., Guangdong (CN)

(72) Inventors: Jian Yao, Guangdong (CN); Erhao Song, Guangdong (CN); Huazheng You, Guangdong (CN); Jialin Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 382 days.

(21) Appl. No.: 18/312,086

(22) Filed: May 4, 2023

(65) Prior Publication Data

US 2023/0275685 A1      Aug. 31, 2023

Related U.S. Application Data

(63) Continuation of application No. PCT/CN2021/136723, filed on Dec. 9, 2021.

(30) Foreign Application Priority Data

Dec. 15, 2020    (CN) .......................... 202011480912.5

(51) Int. Cl.
*H04L 1/00*          (2006.01)
(52) U.S. Cl.
CPC .......... *H04L 1/0003* (2013.01); *H04L 1/0026* (2013.01)

(58) Field of Classification Search
CPC ....... H04W 72/04; H04W 72/12; H04W 8/22; H04L 5/00; H04L 1/00; H03M 7/30
See application file for complete search history.

(56) References Cited

U.S. PATENT DOCUMENTS

2015/0200746 A1      7/2015  Pan et al.
2015/0271794 A1*     9/2015  Kang .................. H04L 27/0008
                                                   370/329

(Continued)

FOREIGN PATENT DOCUMENTS

CN          103580788 A      2/2014
CN          109787711 A      5/2019

(Continued)

OTHER PUBLICATIONS

ZTE, CQI and MCS table design for 1024QAM, 3GPP TSG-RAN WG1 Meeting #90bis, R1-1717443, Oct. 9-13, 2017, Prague, Czech Republic.

(Continued)

*Primary Examiner* — Marcus Smith
*Assistant Examiner* — Francesca Lima Santos
(74) *Attorney, Agent, or Firm* — Price Heneveld LLP

(57)          ABSTRACT
This application pertains to the field of communications technologies and discloses an information transmission method and apparatus, an information reception method and apparatus, a terminal, and a network-side device. A specific implementation solution includes: determining, by a network-side device, a target MCS level corresponding to transmission of a terminal, where the target MCS level is an MCS level in a first MCS table, and the first MCS table includes an MCS level corresponding to 1024QAM; and sending, to the terminal, indication information used to determine the target MCS level.

20 Claims, 4 Drawing Sheets

Determine a target MCS level corresponding to transmission of a terminal ⟋21

Send, to the terminal, indication information used to determine the target MCS level ⟋22

(56)    References Cited

U.S. PATENT DOCUMENTS

| | | | |
|---|---|---|---|
| 2015/0365181 A1 | 12/2015 | Nagata et al. | |
| 2016/0205564 A1 * | 7/2016 | Ren et al. | |
| 2019/0215095 A1 * | 7/2019 | Park | H04L 1/0003 |
| 2019/0364545 A1 * | 11/2019 | Kwon | H04L 1/0026 |
| 2020/0084778 A1 | 3/2020 | Wang et al. | |
| 2020/0267043 A1 | 8/2020 | Chen | |

FOREIGN PATENT DOCUMENTS

| | | | |
|---|---|---|---|
| CN | 110474732 A | 11/2019 | |
| CN | 110855406 A | 2/2020 | |
| CN | 111698066 A | 9/2020 | |
| EP | 3462654 A1 | 4/2019 | |
| EP | 4216464 A1 | 7/2023 | |
| JP | 2014168224 A | 9/2014 | |
| WO | 2015039305 A1 | 3/2015 | |
| WO | 2019161622 A1 | 8/2019 | |

OTHER PUBLICATIONS

Huawei, Hisilicon, On support of DL 1024QAM for NR FR1, 3GPP TSG RAN WG1 Meeting #103-e, R1-2007617, E-meeting, Oct. 26-Nov. 13, 2020.

Ericsson, "1024-QAM for NR DL", 3GPP TSG-RAN WG1 Meeting #103-e, Tdoc R1-2009209, Online, Oct. 26-Nov. 13, 2020.

* cited by examiner

Network-side device 11            11

Terminal

Terminal

Determine a target MCS level corresponding to transmission of a terminal    21

Send, to the terminal, indication information used to determine the target MCS level    22

60

Communications device

61 Processor ⟷ Memory 62

700

Terminal

701 Radio frequency unit

710

Network module 702

Memory
Application program
Operating system
709

Processor

Audio output unit 703

Input unit 704
Graphics processing unit 7041
Microphone 7042

708 Interface unit

707 User input unit
7071 Touch panel
7072 Other input devices

Display unit 706
Display panel 7061

Sensor 705

INFORMATION TRANSMISSION METHOD AND APPARATUS, INFORMATION RECEPTION METHOD AND APPARATUS, TERMINAL, AND NETWORK-SIDE DEVICE

CROSS-REFERENCE TO RELATED APPLICATIONS

This application is a continuation application of PCT International Application No. PCT/CN2021/136723 filed on Dec. 9, 2021, which claims priority to Chinese Patent Application No. 202011480912.5, filed in China on Dec. 15, 2020, which are incorporated herein by reference in their entireties.

TECHNICAL FIELD

This application pertains to the field of communications technologies and specifically relates to an information transmission method and apparatus, an information reception method and apparatus, a terminal, and a network-side device.

BACKGROUND

In an existing communications system, an adaptive modulation and coding (AMC) technology may be used for downlink and uplink traffic channels. This technology is used to determine a modulation mode and a coding rate based on channel conditions to improve the spectral efficiency of the system. However, the current communications system supports only up to 256 quadrature amplitude modulation (QAM), without supporting higher order modulation. Therefore, in an application scenario with a high signal-to-noise ratio, there is a throughput limitation problem.

SUMMARY

According to a first aspect, an information transmission method is provided. The method is performed by a network-side device and includes:

determining a target MCS level corresponding to transmission of a terminal, where the target MCS level is an MCS level in a first MCS table, and the first MCS table includes an MCS level corresponding to 1024QAM; and sending, to the terminal, indication information used to determine the target MCS level.

According to a second aspect, an information reception method is provided. The method is performed by a terminal and includes:

receiving, from a network-side device, indication information used to determine a target MCS level, where the target MCS level is an MCS level in a first MCS table, and the first MCS table includes an MCS level corresponding to 1024QAM; and determining the target MCS level based on the indication information.

According to a third aspect, an information transmission apparatus is provided. The apparatus is applied to a network-side device and includes:

a first determining module, configured to determine a target MCS level corresponding to transmission of a terminal, where the target MCS level is an MCS level in a first MCS table, and the first MCS table includes an MCS level corresponding to 1024QAM; and a first sending module, configured to send, to the terminal, indication information used to determine the target MCS level.

According to a fourth aspect, an information reception apparatus is provided. The apparatus is applied to a terminal and includes:

a second receiving module, configured to receive, from a network-side device, indication information used to determine a target MCS level, where the target MCS level is an MCS level in a first MCS table, and the first MCS table includes an MCS level corresponding to 1024QAM; and a second determining module, configured to determine the target MCS level based on the indication information.

According to a fifth aspect, a network-side device is provided. The network-side device includes a processor, a memory, and a program or instructions stored in the memory and capable of running on the processor. When the program or instructions are executed by the processor, the steps of the method according to the first aspect are implemented.

According to a sixth aspect, a terminal is provided. The terminal includes a processor, a memory, and a program or instructions stored in the memory and capable of running on the processor. When the program or instructions are executed by the processor, the steps of the method according to the second aspect are implemented.

According to a seventh aspect, a readable storage medium is provided. The readable storage medium stores a program or instructions. When the program or instructions are executed by a processor, the steps of the method according to the first aspect are implemented, or the steps of the method according to the second aspect are implemented.

According to an eighth aspect, a chip is provided. The chip includes a processor and a communications interface. The communications interface is coupled to the processor. The processor is configured to run a program or instructions to implement the steps of the method according to the first aspect or implement the steps of the method according to the second aspect.

According to a ninth aspect, a computer program product is provided. The computer program product is stored in a non-volatile storage medium. The computer program product is executed by at least one processor to implement the steps of the method according to the first aspect or implement the steps of the method according to the second aspect.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances, so that the embodiments of this application can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this application are not limited to a long term evolution (LTE)/LTE-Advanced LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. The described technologies may be used for the foregoing systems and radio technologies, and may also be used for other systems and radio technologies. In the following descriptions, a new radio (NR) system is described for an illustrative purpose, and NR terms are used in most of the following descriptions. However, these technologies may also be applied to other systems than the NR system, for example, a 6th Generation (6G) communications system.

Figure 1:
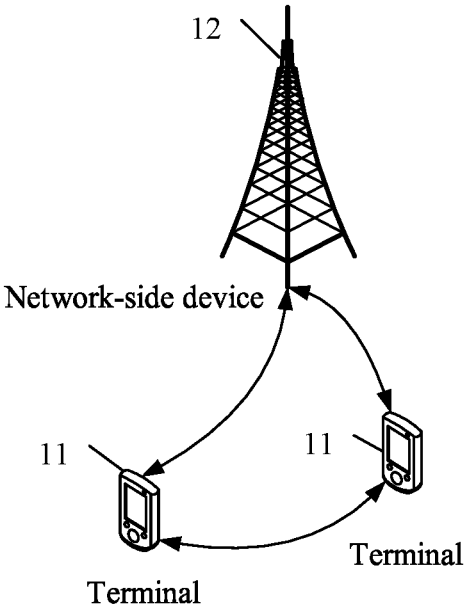
FIG. 1 is a schematic diagram of a wireless communications system according to an embodiment of this application.

FIG. 1 is a schematic diagram of a wireless communications system to which an embodiment of this application may be applied. The wireless communications system includes a terminal 11 and a network-side device 12. The terminal 11 may also be referred to as a terminal device or a user equipment (UE). The terminal 11 may be a terminal-side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device (Wearable Device), a vehicular user equipment (VUE), or a pedestrian user equipment (PUE). The wearable device includes smart bands, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms.

For ease of understanding of the embodiments of this application, the following content is first described.

In a current NR system, an AMC technology is used for both a physical downlink shared channel (PDSCH) and a physical uplink shared channel (PUSCH). This technology is used to determine a modulation mode and a coding rate based on channel conditions to improve the spectral efficiency of the system. A highest modulation order supported by the PDSCH in the existing NR system is 8, and a total of four modulation modes are included: quadrature phase shift keying (QPSK), 16QAM, 64QAM, and 256QAM. The amount of information transmitted by each modulation symbol in each modulation mode is as follows: 2 bits, 4 bits, 6 bits, and 8 bits.

Each modulation mode and each coding rate correspond to one modulation and coding scheme (MCS) level. The current NR version defines three MCS tables for the PDSCH. Content of the tables includes an MCS index, a modulation order, a target coding rate, and spectral efficiency, as shown in the following Table 1, Table 2, and Table 3. An MCS index 0 indicates a first MCS level, an MCS index 1 indicates a second MCS level, and so on. To be specific, each MCS index uniquely corresponds to one MCS level.

TABLE 1

| MCS index $I_{MCS}$ | Modulation order $Q_m$ | Target coding rate R x [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 2

| MCS index $I_{MCS}$ | Modulation order $Q_m$ | Target coding rate R x [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 3

| MCS index $I_{MCS}$ | Modulation order $Q_m$ | Target coding rate R x [1024] | Spectral efficiency |
|---|---|---|---|
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

In an optional embodiment, a network-side device such as a base station notifies a terminal of a determined MCS level by using 5-bit indication information in downlink control information (DCI). Based on the MCS level indicated by the indication information received by using a physical downlink control channel (PDCCH), the terminal learns the MCS level used by the base station to transmit data on a PDSCH, and determines, based on correspondences in Table 1 to Table 3, a modulation order and a coding rate corresponding to the MCS level, to demodulate and decode corresponding data on the PDSCH.

In addition, the terminal needs to measure a downlink channel and feed back a channel quality indicator (CQI) to the base station. The CQI feedback is to send a recommended modulation mode and coding rate by using a physical uplink shared channel (PUSCH) or a physical uplink control channel (PUCCH). The base station determines a corresponding MCS for the uplink/downlink channel based on the CQI fed back by the terminal and a prediction algorithm. In the current NR version, the modulation mode and coding rate are quantified into 15 CQI levels, which are defined in the forms of 4-bit tables, that is, CQI tables, as shown in the following Table 4, Table 5, and Table 6, corresponding to the foregoing Table 1, Table 2, and Table 3. Modulation modes, coding rates, and spectral efficiency corresponding to different CQI levels are defined in Table 4 to Table 6. A CQI index 0 indicates a first CQI level, a CQI index 1 indicates a second CQI level, and so on.

TABLE 4

| CQI index | Modulation | Coding rate x 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

TABLE 5

| CQI index | Modulation | Coding rate × 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

TABLE 6

| CQI index | Modulation | Coding rate × 1024 | Efficiency |
|---|---|---|---|
| 0 | | out of range | |
| 1 | QPSK | 30 | 0.0586 |
| 2 | QPSK | 50 | 0.0977 |
| 3 | QPSK | 78 | 0.1523 |
| 4 | QPSK | 120 | 0.2344 |
| 5 | QPSK | 193 | 0.3770 |
| 6 | QPSK | 308 | 0.6016 |
| 7 | QPSK | 449 | 0.8770 |
| 8 | QPSK | 602 | 1.1758 |
| 9 | 16QAM | 378 | 1.4766 |
| 10 | 16QAM | 490 | 1.9141 |
| 11 | 16QAM | 616 | 2.4063 |
| 12 | 64QAM | 466 | 2.7305 |
| 13 | 64QAM | 567 | 3.3223 |
| 14 | 64QAM | 666 | 3.9023 |
| 15 | 64QAM | 772 | 4.5234 |

To further improve the spectral efficiency, a higher-order modulation mode is defined in LTE, and an MCS table and a CQI table corresponding to this modulation mode are shown in Table 7 and Table 8. Table 7 may be referred to as an MCS table, and this table includes an MCS index, a modulation order, and a transport block size (TBS) index of the PDSCH, and defines modulation orders and TBS indexes corresponding to different MCS levels in downlink scheduling. Modulation modes, coding rates, and spectral efficiency corresponding to different CQI levels are defined in Table 8.

TABLE 7

| MCS index $I_{MCS}$ | Modulation order $Q_m$ | TBS index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 11 |
| 6 | 4 | 13 |
| 7 | 4 | 15 |
| 8 | 6 | 16 |
| 9 | 6 | 18 |
| 10 | 6 | 20 |
| 11 | 6 | 21 |
| 12 | 6 | 22 |
| 13 | 6 | 23 |
| 14 | 6 | 24 |
| 15 | 8 | 25 |
| 16 | 8 | 27 |
| 17 | 8 | 28 |
| 18 | 8 | 29 |
| 19 | 8 | 30 |
| 20 | 8 | 31 |
| 21 | 8 | 32 |
| 22 | 8 | 33/33A/33B |
| 23 | 10 | 34A |
| 24 | 10 | 35 |
| 25 | 10 | 36 |
| 26 | 10 | 37A/37 |
| 27 | 2 | reserved |
| 28 | 4 | |
| 29 | 6 | |
| 30 | 8 | |
| 31 | 10 | |

TABLE 8

| CQI index | Modulation | Coding rate × 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 616 | 2.4063 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 853 | 8.3321 |
| 15 | 1024QAM | 948 | 9.2578 |

An information transmission method and an information reception method provided in the embodiments of this application are hereinafter described in detail by using specific embodiments and application scenarios thereof with reference to the accompanying drawings.

Figure 2:
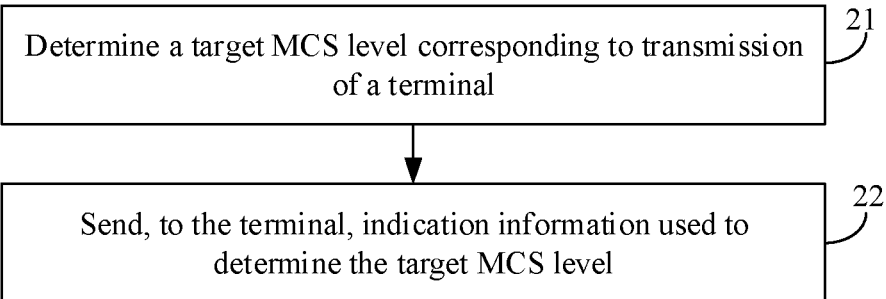
FIG. 2 is a flowchart of an information transmission method according to an embodiment of this application.

FIG. 2 is a flowchart of an information transmission method according to an embodiment of this application. The method is performed by a network-side device. As shown in FIG. 2, the method includes the following steps.

Step 21: Determine a target MCS level corresponding to transmission of a terminal.

In this embodiment, the target MCS level corresponding to the transmission of the terminal may be understood as an MCS level to be used for downlink reception or uplink transmission of the terminal. The target MCS level is an MCS level in a first MCS table, and the first MCS table includes an MCS level corresponding to 1024QAM. To be specific, the first MCS table includes an MCS level corresponding to a modulation mode of a modulation order 10.

Optionally, the first MCS table includes at least an MCS index corresponding to the modulation mode of the modulation order 10, that is, 1024QAM, and a corresponding coding rate and spectral efficiency, and each MCS index uniquely corresponds to one MCS level.

Step 22: Send, to the terminal, indication information used to determine the target MCS level.

Optionally, the terminal may send, to the terminal by using radio resource control (RRC) signaling, the indication information used to determine the target MCS level, so that the terminal determines the target MCS level based on the indication information and the first MCS table.

In an implementation, the network-side device such as a base station may determine, based on the first MCS table, the target MCS level corresponding to the transmission of the terminal, such as an MCS level corresponding to a channel scheduled for the terminal, and notify the terminal, to instruct the terminal to determine, based on the MCS level, the modulation mode and coding rate to be used for the channel scheduled for the terminal.

In this embodiment of this application, the network-side device may determine the target MCS level corresponding to the transmission of the terminal, where the target MCS level is the MCS level in the first MCS table, and the first MCS table includes the MCS level corresponding to 1024QAM; and send, to the terminal, the indication information used to determine the target MCS level. This enables the corresponding communications system to support 1024QAM. Therefore, in comparison with the prior art, higher-order modulation is supported, and a throughput limitation problem in an application scenario with a high signal-to-noise ratio is resolved.

In this embodiment of this application, the network-side device may receive a target CQI from the terminal, where the target CQI is a CQI in a first CQI table, and the first CQI table includes a CQI level corresponding to 1024QAM. Then, based on the received CQI and the first MCS table, the network-side device may determine the target MCS level corresponding to the transmission of the terminal and notify the terminal, to instruct the terminal to determine, based on the MCS level, the modulation mode and coding rate to be used for downlink reception or uplink transmission of the terminal.

It should be noted that the foregoing target CQI may be determined by the terminal based on a channel measurement result and the first CQI table. The first CQI table includes at least a CQI index corresponding to the modulation mode of the modulation order 10, that is, 1024QAM, and the corresponding coding rate and spectral efficiency, and each CQI index uniquely corresponds to one CQI level.

In this embodiment of this application, the network-side device may indicate, by using higher layer signaling, for example, by using a higher layer parameter mcs-Table or other newly defined higher layer parameters, at least one MCS table to be used by the terminal. The indicated at least one MCS table includes at least one MCS table containing the MCS level corresponding to 1024QAM.

In an optional embodiment, if the indicated at least one MCS table is at least two first MCS tables, when indicating the first MCS table corresponding to the transmission of the terminal, RRC signaling may directly indicate selection of one of the at least two first MCS tables, or RRC signaling may configure at least two first MCS tables and then selection of one of the at least two first MCS tables is indicated by using a media access control control element (MAC CE) or DCI, or selection of one of the at least two first MCS tables is indicated by using different radio network temporary identifiers (RNTI) for scrambling DCI.

For example, if the indicated at least one MCS table is two MCS tables containing MCS levels corresponding to 1024QAM, that is, first MCS tables, RRC signaling may directly indicate selection of one of the at least two 1024QAM MCS tables, or RRC signaling may configure the two 1024QAM MCS tables and then selection of one of the two 1024QAM MCS tables is indicated by using a MAC CE or DCI, or selection of one of the two 1024QAM MCS tables is indicated by using different RNTIs for scrambling.

At least one MCS entry is different between different 1024QAM MCS tables, that is, different first MCS tables. For example, if the indicated at least one MCS table includes two first MCS tables, that is, MCS table 1 and MCS table 2, a difference between the MCS table 1 and the MCS table 2 may be: the MCS table 2 is an MCS table having an MCS entry with a modulation mode of 256QAM, a target coding rate of 948, and spectral efficiency of 7.4063 to replace an MCS entry with a modulation mode of 1024QAM, a target coding rate of 758/758.5/759, and spectral efficiency of 7.4023/7.4072/7.4121 in the MCS table 1.

Optionally, in this embodiment of this application, the network-side device may send first indication information to the terminal, where the first indication information is used to indicate a first MCS table to be used by the terminal, and the first indication information may be sent by using RRC signaling.

For example, the network-side device indicates, by using RRC signaling, the first MCS table to be used by the terminal. The first MCS table may be a 5-bit table, that is, a table with 32 entries, or a 6-bit table, that is, a table with 64 entries.

Optionally, in this embodiment of this application, the network-side device may send second indication information and third indication information to the terminal. The second indication information is used to indicate at least two first MCS tables configured for the terminal; and the third indication information is used to indicate a first MCS table to be selected from the at least two first MCS tables for use by the terminal. The second indication information may be sent by using RRC signaling. The third indication information may be sent by using a MAC CE or DCI.

For example, the network-side device may indicate, by using RRC signaling, a plurality of first MCS tables to be used by the terminal, including a 5-bit table and a 6-bit table, and further indicate, by using a MAC CE, DCI, or an RNTI for scrambling DCI, the 5-bit table or the 6-bit table to be used.

For another example, the network-side device may indicate, by using RRC signaling, a plurality of first MCS tables to be used by the terminal, including 5-bit tables, and further indicate, by using a MAC CE, DCI, or an RNTI for scrambling DCI, one of the plurality of 5-bit tables to be used. For example, if two first MCS tables indicated by using RRC signaling are 5-bit tables and a first MCS table to be used is further indicated by using DCI, 5-bit information may be used to indicate an MCS level corresponding to the transmission of the terminal and 1-bit information may be used to indicate a 5-bit MCS table corresponding to the MCS level.

In this embodiment of this application, the network-side device may indicate, by using higher layer signaling, for example, by using a higher layer parameter cqi-Table or other newly defined higher layer parameters, at least one CQI table to be used by the terminal for CQI feedback. The indicated at least one CQI table includes at least one CQI table containing the CQI level corresponding to 1024QAM.

In an optional embodiment, if the indicated at least one CQI table is at least two first CQI tables, when indicating the first CQI table corresponding to the transmission of the terminal, RRC signaling may directly indicate selection of one of the at least two first CQI tables, or RRC signaling may configure at least two first CQI tables and then selection of one of the at least two first CQI tables is indicated by using a MAC CE or DCI, or selection of one of the at least two first CQI tables is indicated by using different RNTIs for scrambling DCI.

For example, if the indicated at least one CQI table is two CQI tables containing CQI levels corresponding to 1024QAM, that is, first CQI tables, RRC signaling may directly indicate selection of one of the at least two 1024QAM CQI tables, or RRC signaling may configure the two 1024QAM CQI tables and then selection of one of the two 1024QAM CQI tables is indicated by using a MAC CE or DCI, or selection of one of the two 1024QAM CQI tables is indicated by using different RNTIs for scrambling.

At least one CQI entry is different between different 1024QAM CQI tables, that is, different first CQI tables. For example, if the indicated at least one CQI table includes two first CQI tables, that is, CQI table 1 and CQI table 2, a difference between the CQI table 1 and the CQI table 2 may be: the CQI table 2 is a CQI table having a CQI entry with a modulation mode of 256QAM, a target coding rate of 948, and spectral efficiency of 7.4063 to replace a CQI entry with a modulation mode of 1024QAM, a target coding rate of 758/758.5/759, and spectral efficiency of 7.4023/7.4072/ 7.4121 in the CQI table 1.

Optionally, in this embodiment of this application, the network-side device may send fourth indication information to the terminal, where the fourth indication information is used to indicate a first CQI table to be used by the terminal for CQI feedback; and the fourth indication information may be sent by using RRC signaling.

Optionally, in this embodiment of this application, the network-side device may send fifth indication information and sixth indication information to the terminal. The fifth indication information is used to indicate at least two first CQI tables configured for the terminal; and the sixth indication information is used to indicate a first CQI table to be selected from the at least two first CQI tables for CQI feedback by the terminal. The fifth indication information may be sent by using RRC signaling; and the sixth indication information may be sent by using a MAC CE or DCI.

In this embodiment of this application, optionally, the first MCS table may be determined according to at least one of the following design principles:

(1) reserving an existing coding rate and spectral efficiency in an existing 1024QAM CQI table; for example, reserving an existing coding rate and spectral efficiency in a 1024QAM CQI table of an NR system;

(2) ensuring equal spectral efficiency intervals;

(3) ensuring equal coding rate intervals;

(4) ensuring equal signal-to-noise ratio intervals;

(5) in presence of a decimal fraction in a coding rate, using a first algorithm to process the coding rate, where the first algorithm may include any one of the following: rounding up, rounding down, rounding off, retaining one decimal place, and the like;

(6) in a case of retaining four decimal places in spectral efficiency, using a rounding algorithm to process the spectral efficiency; and (7) a relationship between spectral efficiency and a target coding rate satisfying the following equation: spectral efficiency=target coding rate/1024*modulation order.

Optionally, the first CQI table may be determined according to at least one of the following design principles:

(1) ensuring equal spectral efficiency intervals;

(2) ensuring equal coding rate intervals;

(3) ensuring equal signal-to-noise ratio intervals;

(4) in presence of a decimal fraction in a coding rate, using a first algorithm to process the coding rate, where the first algorithm may include any one of the following: rounding up, rounding down, rounding off, and retaining one decimal place;

(5) in a case of retaining four decimal places in spectral efficiency, using a rounding algorithm to process the spectral efficiency; and (6) a relationship between spectral efficiency and a target coding rate satisfying the following equation: spectral efficiency=target coding rate/1024*modulation order.

Optionally, based on the design principles of the first MCS table and the first CQI table, design schemes for the first MCS table and the first CQI table may include but are not limited to the following:

Scheme 1

In scheme 1, the first CQI table may include at least one of the following corresponding to 1024QAM: a first CQI level, a second CQI level, and a third CQI level, where a target coding rate corresponding to the first CQI level is any one of the following: 758, 758.5, and 759; and spectral efficiency corresponding to the first CQI level is any one of the following: 7.4023, 7.4072, and 7.4121;

a target coding rate corresponding to the second CQI level is 853; and spectral efficiency corresponding to the second CQI level is 8.3301; and a target coding rate corresponding to the third CQI level is 948; and spectral efficiency corresponding to the third CQI level is 9.2578.

Further, a CQI level not included in the first CQI table includes at least one of the following: a fourth CQI level corresponding to 16QAM, a fifth CQI level corresponding to 64QAM, and a sixth CQI level corresponding to 256QAM, where a target coding rate corresponding to the fourth CQI level is 490; and spectral efficiency corresponding to the fourth CQI level is 1.9141; a target coding rate corresponding to the fifth CQI level is 466; and spectral efficiency corresponding to the fifth CQI level is 2.7305; and a target coding rate corresponding to the sixth CQI level is 948; and spectral efficiency corresponding to the sixth CQI level is 7.4063.

Scheme 2

In scheme 2, the first MCS table may include at least one of the following corresponding to 1024QAM: a first MCS level, a second MCS level, a third MCS level, a fourth MCS level, a fifth MCS level, and a sixth MCS level, where a target coding rate corresponding to the first MCS level is any one of the following: 758, 758.5, and 759; and spectral efficiency corresponding to the first MCS level is any one of the following: 7.4023, 7.4072, and 7.4121;

a target coding rate corresponding to the second MCS level is any one of the following: 805, 805.5, and 806; and spectral efficiency corresponding to the second MCS level is any one of the following: 7.8613, 7.8662, and 7.8711;

a target coding rate corresponding to the third MCS level is 853; and spectral efficiency corresponding to the third MCS level is 8.3301;

a target coding rate corresponding to the fourth MCS level is any one of the following: 900, 900.5, and 901; and spectral efficiency corresponding to the fourth MCS level is any one of the following: 8.7891, 8.7939, and 8.7988;

a target coding rate corresponding to the fifth MCS level is 948; and spectral efficiency corresponding to the fifth MCS level is 9.2578; and a target coding rate corresponding to the sixth MCS level is reserved; and spectral efficiency corresponding to the sixth MCS level is reserved.

Further, an MCS level not included in the first MCS table may include at least one of the following: a seventh MCS level, an eighth MCS level, a ninth MCS level, a tenth MCS level, an eleventh MCS level, and a twelfth MCS level.

Optionally, a case of the MCS levels may be any one of the following:

Case 1: The seventh MCS level, the eighth MCS level, and the ninth MCS level correspond to 16QAM; the tenth MCS level and the eleventh MCS level correspond to 64QAM; and the twelfth MCS level corresponds to 256QAM;

a target coding rate corresponding to the seventh MCS level is 434; and spectral efficiency corresponding to the seventh MCS level is 1.6953; a target coding rate corresponding to the eighth MCS level is 553; and spectral efficiency corresponding to the eighth MCS level is 2.1602; a target coding rate corresponding to the ninth MCS level is 658; and spectral efficiency corresponding to the ninth MCS level is 2.5703; a target coding rate corresponding to the tenth MCS level is 517; and spectral efficiency corresponding to the tenth MCS level is 3.0293; a target coding rate corresponding to the eleventh MCS level is 616; and spectral efficiency corresponding to the eleventh MCS level is 3.6094; and a target coding rate corresponding to the twelfth MCS level is 948; and spectral efficiency corresponding to the twelfth MCS level is 7.4063.

Case 2: The seventh MCS level and the eighth MCS level correspond to QPSK; the ninth MCS level, the tenth MCS level, and the eleventh MCS level correspond to 16QAM; and the twelfth MCS level corresponds to 256QAM;

a target coding rate corresponding to the seventh MCS level is 308; and spectral efficiency corresponding to the seventh MCS level is 0.6016; a target coding rate corresponding to the eighth MCS level is 602; and spectral efficiency corresponding to the eighth MCS level is 1.1758; a target coding rate corresponding to the ninth MCS level is 434; and spectral efficiency corresponding to the ninth MCS level is 1.6953; a target coding rate corresponding to the tenth MCS level is 553; and spectral efficiency corresponding to the tenth MCS level is 2.1602; a target coding rate corresponding to the eleventh MCS level is 658; and spectral efficiency corresponding to the eleventh MCS level is 2.5703; and a target coding rate corresponding to the twelfth MCS level is 948; and spectral efficiency corresponding to the twelfth MCS level is 7.4063.

Case 3: The seventh MCS level, the eighth MCS level, and the ninth MCS level correspond to 16QAM; the tenth MCS level and the eleventh MCS level correspond to 64QAM; and the twelfth MCS level corresponds to 256QAM;

a target coding rate corresponding to the seventh MCS level is 378; and spectral efficiency corresponding to the seventh MCS level is 1.4766; a target coding rate corresponding to the eighth MCS level is 490; and spectral efficiency corresponding to the eighth MCS level is 1.9141; a target coding rate corresponding to the ninth MCS level is 616; and spectral efficiency corresponding to the ninth MCS level is 2.4063; a target coding rate corresponding to the tenth MCS level is 517; and spectral efficiency corresponding to the tenth MCS level is 3.0293; a target coding rate corresponding to the eleventh MCS level is 616; and spectral efficiency corresponding to the eleventh MCS level is 3.6094; and a target coding rate corresponding to the twelfth MCS level is 948; and spectral efficiency corresponding to the twelfth MCS level is 7.4063.

Scheme 3

In scheme 3, the first MCS table may include at least one of the following corresponding to 1024QAM: a thirteenth MCS level, a fourteenth MCS level, a fifteenth MCS level, a sixteenth MCS level, a seventeenth MCS level, an eighteenth MCS level, a nineteenth MCS level, and a twentieth MCS level, where a target coding rate corresponding to the thirteenth MCS level is any one of the following: 758, 758.5, and 759; and spectral efficiency corresponding to the thirteenth MCS level is any one of the following: 7.4023, 7.4072, and 7.4121;

a target coding rate corresponding to the fourteenth MCS level is any one of the following: 789, 789.5, 790, 790.5, and 791; and spectral efficiency corresponding to the fourteenth MCS level is any one of the following: 7.7051, 7.71, 7.7148, 7.7197, and 7.7246;

a target coding rate corresponding to the fifteenth MCS level is any one of the following: 821, 821.5, and 822; and spectral efficiency corresponding to the fifteenth MCS level is any one of the following: 8.0176, 8.0225, and 8.0273;

a target coding rate corresponding to the sixteenth MCS level is 853; and spectral efficiency corresponding to the sixteenth MCS level is 8.3301;

a target coding rate corresponding to the seventeenth MCS level is any one of the following: 884, 884.5, and 885; and spectral efficiency corresponding to the seventeenth MCS level is any one of the following: 8.6328, 8.6377, and 8.6426;

a target coding rate corresponding to the eighteenth MCS level is any one of the following: 916, 916.5, and 917; and spectral efficiency corresponding to the eighteenth MCS level is any one of the following: 8.9453, 8.9502, and 8.9551;

a target coding rate corresponding to the nineteenth MCS level is 948; and spectral efficiency corresponding to the nineteenth MCS level is 9.2578; and a target coding rate corresponding to the twentieth MCS level is reserved; and spectral efficiency corresponding to the twentieth MCS level is reserved.

Further, an MCS level not included in the first MCS table includes at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level.

Optionally, a case of the MCS levels not included may be any one of the following:

Case 4: The twenty-first MCS level, the twenty-second MCS level, and the twenty-third MCS level correspond to 16QAM; the twenty-fourth MCS level, the twenty-fifth MCS level, the twenty-sixth MCS level, and the twenty-seventh MCS level correspond to 64QAM; and the twenty-eighth MCS level corresponds to 256QAM;

a target coding rate corresponding to the twenty-first MCS level is 434; and spectral efficiency corresponding to the twenty-first MCS level is 1.6953; a target coding rate corresponding to the twenty-second MCS level is 553; and spectral efficiency corresponding to the twenty-second MCS level is 2.1602; a target coding rate corresponding to the twenty-third MCS level is 658; and spectral efficiency corresponding to the twenty-third MCS level is 2.5703; a target coding rate corresponding to the twenty-fourth MCS level is 517; and spectral efficiency corresponding to the twenty-fourth MCS level is 3.0293; a target coding rate corresponding to the twenty-fifth MCS level is 616; and spectral efficiency corresponding to the twenty-fifth MCS level is 3.6094; a target coding rate corresponding to the twenty-sixth MCS level is 719; and spectral efficiency corresponding to the twenty-sixth MCS level is 4.2129; a target coding rate corresponding to the twenty-seventh MCS level is 822; and spectral efficiency corresponding to the twenty-seventh MCS level is 4.8164; and a target coding rate corresponding to the twenty-eighth MCS level is 948; and spectral efficiency corresponding to the twenty-eighth MCS level is 7.4063.

Case 5: The twenty-first MCS level and the twenty-second MCS level correspond to QPSK; the twenty-third MCS level, the twenty-fourth MCS level, and the twenty-fifth MCS level correspond to 16QAM; the twenty-sixth MCS level and the twenty-seventh MCS level correspond to 64QAM; and the twenty-eighth MCS level corresponds to 256QAM;

a target coding rate corresponding to the twenty-first MCS level is 308; and spectral efficiency corresponding to the twenty-first MCS level is 0.6016; a target coding rate corresponding to the twenty-second MCS level is 602; and spectral efficiency corresponding to the twenty-second MCS level is 1.1758; a target coding rate corresponding to the twenty-third MCS level is 434; and spectral efficiency corresponding to the twenty-third MCS level is 1.6953; a target coding rate corresponding to the twenty-fourth MCS level is 553; and spectral efficiency corresponding to the twenty-fourth MCS level is 2.1602; a target coding rate corresponding to the twenty-fifth MCS level is 658; and spectral efficiency corresponding to the twenty-fifth MCS level is 2.5703; a target coding rate corresponding to the twenty-sixth MCS level is 517; and spectral efficiency corresponding to the twenty-sixth MCS level is 3.0293; a target coding rate corresponding to the twenty-seventh MCS level is 616; and spectral efficiency corresponding to the twenty-seventh MCS level is 3.6094; and a target coding rate corresponding to the twenty-eighth MCS level is 948; and spectral efficiency corresponding to the twenty-eighth MCS level is 7.4063.

Case 6: The twenty-first MCS level and the twenty-second MCS level correspond to QPSK; the twenty-third MCS level, the twenty-fourth MCS level, and the twenty-fifth MCS level correspond to 16QAM; the twenty-sixth MCS level and the twenty-seventh MCS level correspond to 64QAM; and the twenty-eighth MCS level corresponds to 256QAM;

a target coding rate corresponding to the twenty-first MCS level is 193; and spectral efficiency corresponding to the twenty-first MCS level is 0.3770; a target coding rate corresponding to the twenty-second MCS level is 449; and spectral efficiency corresponding to the twenty-second MCS level is 0.8770; a target coding rate corresponding to the twenty-third MCS level is 378; and spectral efficiency corresponding to the twenty-third MCS level is 1.4766; a target coding rate corresponding to the twenty-fourth MCS level is 490; and spectral efficiency corresponding to the twenty-fourth MCS level is 1.9141; a target coding rate corresponding to the twenty-fifth MCS level is 616; and spectral efficiency corresponding to the twenty-fifth MCS level is 2.4063; a target coding rate corresponding to the twenty-sixth MCS level is 517; and spectral efficiency corresponding to the twenty-sixth MCS level is 3.0293; a target coding rate corresponding to the twenty-seventh MCS level is 616; and spectral efficiency corresponding to the twenty-seventh MCS level is 3.6094; and a target coding rate corresponding to the twenty-eighth MCS level is 948; and spectral efficiency corresponding to the twenty-eighth MCS level is 7.4063.

Case 7: The twenty-first MCS level, the twenty-second MCS level, and the twenty-third MCS level correspond to 16QAM; the twenty-fourth MCS level, the twenty-fifth MCS level, the twenty-sixth MCS level, and the twenty-seventh MCS level correspond to 64QAM; and the twenty-eighth MCS level corresponds to 256QAM;

a target coding rate corresponding to the twenty-first MCS level is 378; and spectral efficiency corresponding to the twenty-first MCS level is 1.4766; a target coding rate corresponding to the twenty-second MCS level is 490; and spectral efficiency corresponding to the twenty-second MCS level is 1.9141; a target coding rate corresponding to the twenty-third MCS level is 616; and spectral efficiency corresponding to the twenty-third MCS level is 2.4063; a target coding rate corresponding to the twenty-fourth MCS level is 517; and spectral efficiency corresponding to the twenty-fourth MCS level is 3.0293; a target coding rate corresponding to the twenty-fifth MCS level is 616; and spectral efficiency corresponding to the twenty-fifth MCS level is 3.6094; a target coding rate corresponding to the twenty-sixth MCS level is 719; and spectral efficiency corresponding to the twenty-sixth MCS level is 4.2129; a target coding rate corresponding to the twenty-seventh MCS level is 822; and spectral efficiency corresponding to the twenty-seventh MCS level is 4.8164; and a target coding rate corresponding to the twenty-eighth MCS level is 948; and spectral efficiency corresponding to the twenty-eighth MCS level is 7.4063.

Scheme 4

In scheme 4, in comparison with the foregoing scheme 1, the first CQI table further includes at least one of the following corresponding to 1024QAM: a seventh CQI level and an eighth CQI level, where a target coding rate corresponding to the seventh CQI level is any one of the following: 805, 805.5, and 806; and spectral efficiency corresponding to the seventh CQI level is any one of the following: 7.8613, 7.8662, and 7.8711; and a target coding rate corresponding to the eighth CQI level is any one of the following: 900, 900.5, and 901; and spectral efficiency corresponding to the eighth CQI level is any one of the following: 8.7891, 8.7939, and 8.7988.

Further, a CQI level not included in the first CQI table may include at least one of the following: a ninth CQI level and a tenth CQI level.

Optionally, a case of the CQI levels not included may be any one of the following:

Case 8: The ninth CQI level and the tenth CQI level correspond to 64QAM; a target coding rate corresponding to the ninth CQI level is 666; and spectral efficiency corresponding to the ninth CQI level is 3.9023; and a target coding rate corresponding to the tenth CQI level is 873; and spectral efficiency corresponding to the tenth CQI level is 5.1152.

Case 9: The ninth CQI level corresponds to QPSK; and the tenth CQI level corresponds to 64QAM; a target coding rate corresponding to the ninth CQI level is 193; and spectral efficiency corresponding to the ninth CQI level is 0.3770; and a target coding rate corresponding to the tenth CQI level is 666; and spectral efficiency corresponding to the tenth CQI level is 3.9023.

Scheme 5

In scheme 5, the first MCS table may include at least one of the following corresponding to 1024QAM: a twenty-ninth MCS level, a thirtieth MCS level, a thirty-first MCS level, and a thirty-second MCS level, where a target coding rate corresponding to the twenty-ninth MCS level is any one of the following: 781, 781.5, 782, 782.5, and 783; and spectral efficiency corresponding to the twenty-ninth MCS level is any one of the following: 7.627, 7.6318, 7.6367, 7.6416, and 7.6465;

a target coding rate corresponding to the thirtieth MCS level is any one of the following: 828, 828.5, 829, 829.5, and 830; and spectral efficiency corresponding to the thirtieth MCS level is any one of the following: 8.0859, 8.0908, 8.0957, 8.1006, and 8.1055;

a target coding rate corresponding to the thirty-first MCS level is any one of the following: 876, 876.5, and 877; and spectral efficiency corresponding to the thirty-first MCS level is any one of the following: 8.5547, 8.5596, and 8.5645; and a target coding rate corresponding to the thirty-second MCS level is any one of the following: 924, 924.5, and 925; and spectral efficiency corresponding to the thirty-second MCS level is any one of the following: 9.0234, 9.0283, and 9.0332.

Further, an MCS level not included in the first MCS table may include a thirty-third MCS level corresponding to 64QAM, where a target coding rate corresponding to the thirty-third MCS level is 434; and spectral efficiency corresponding to the thirty-third MCS level is 1.6953.

The following describes the foregoing schemes 1 to 5 in detail with reference to specific embodiments.

Embodiment 1

In Embodiment 1, corresponding to the foregoing scheme 1, an NR 1024QAM CQI table is designed based on the 256QAM CQI table defined in the current NR system, as shown in the foregoing Table 5, and added 1024QAM CQI entries may be shown in the following Table 1-1.

TABLE 1-1

| CQI index | Modulation | Coding rate × 1024 | Efficiency |
|---|---|---|---|
| 13 | 1024QAM | 758/758.5/759 | 7.4023/7.4072/7.4121 |
| 14 | 1024QAM | 853 | 8.3301 |
| 15 | 1024QAM | 948 | 9.2578 |

CQI entry 13, CQI entry 14, and CQI entry 15 in Table 1-1 are obtained based on an LTE 1024QAM CQI table, that is, the foregoing Table 8, with reference to the CQI design principle (4), principle (5), and principle (6).

Further, based on the foregoing CQI design principle (1), principle (2), or principle (3), the 256QAM CQI table defined in the current NR system, that is, the foregoing Table 5, is reduced, and determined reduced CQI entries may be shown in the following Table 1-2.

TABLE 1-2

| CQI index | Modulation | Coding rate × 1024 | Efficiency |
|---|---|---|---|
| 5 | 16QAM | 490 | 1.9141 |
| 7 | 64QAM | 466 | 2.7305 |
| 15 | 256QAM | 948 | 7.4063 |

The finally obtained NR 1024QAM CQI table may be shown in the following Table 9.

TABLE 9

| CQI index | Modulation | Coding rate × 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |

TABLE 9-continued

| CQI index | Modulation | Coding rate × 1024 | Efficiency |
|---|---|---|---|
| 5 | 16QAM | 616 | 2.4063 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 1024QAM | 758/758.5/759 | 7.4023/7.4072/7.4121 |
| 14 | 1024QAM | 853 | 8.3301 |
| 15 | 1024QAM | 948 | 9.2578 |

In this embodiment, when an NR 1024QAM MCS table is designed based on the foregoing NR 1024QAM CQI table, that is, Table 9, added MCS entries {22, 23, 24, 25, 26, 31} may be determined according to the foregoing MCS table design principles and the 256QAM MCS table defined in the current NR system, that is, the foregoing Table 2, corresponding to the foregoing scheme 2, as shown in the following Table 1-3.

TABLE 1-3

| MCS index $I_{MCS}$ | Modulation order $Q_m$ | Target coding rate R × [1024] | Spectral efficiency |
|---|---|---|---|
| 22 | 10 | 758/758.5/759 | 7.4023/7.4072/7.4121 |
| 23 | 10 | 805/805.5/806 | 7.8613/7.8662/7.8711 |
| 24 | 10 | 853 | 8.3301 |
| 25 | 10 | 900/900.5/901 | 8.7891/8.7939/8.7988 |
| 26 | 10 | 948 | 9.2578 |
| 31 | 10 | reserved | reserved |

MCS entry 31 in Table 1-3 may be used for retransmission.

MCS entry 22, MCS entry 24, and MCS entry 26 in Table 1-3 are obtained according to the foregoing MCS table design principle (1) with reference to the foregoing NR 1024QAM CQI table, that is, CQI entry 13, CQI entry 14, and CQI entry 15 in Table 9.

MCS entry 23 in Table 1-3 is obtained by interpolating MCS entry 22 and MCS entry 24 according to the foregoing MCS table design principle (2), principle (3), or principle (4). A specific value of the coding rate is determined according to the foregoing MCS table design principle (5) and principle (7), and a specific value of spectral efficiency is determined according to the foregoing MCS table design principle (6) and principle (7).

MCS entry 25 in Table 1-3 is obtained by interpolating MCS entry 24 and MCS entry 26 according to the foregoing MCS table design principle (2), principle (3), or principle (4). A specific value of the coding rate is determined according to the foregoing MCS table design principle (5) and principle (7), and a specific value of spectral efficiency is determined according to the foregoing MCS table design principle (6) and principle (7).

Further, because the number of added MCS entries is 6, the existing MCS entries in the current NR 256QAM MCS table, that is, Table 2, may be reduced according to the foregoing MCS table design principle (1) and principle (2), or principle (3), or principle (4), and determined reduced MCS entries may be shown in the following Table 1-4 or Table 1-5.

TABLE 1-4

| MCS index $I_{MCS}$ | Modulation order $Q_m$ | Target coding rate R × [1024] | Spectral efficiency |
|---|---|---|---|
| 6 | 4 | 434 | 1.6953 |
| 8 | 4 | 553 | 2.1602 |
| 10 | 4 | 658 | 2.5703 |
| 12 | 6 | 517 | 3.0293 |
| 14 | 6 | 616 | 3.6094 |
| 27 | 8 | 948 | 7.4063 |

TABLE 1-5

| MCS index $I_{MCS}$ | Modulation order $Q_m$ | Target coding rate R × [1024] | Spectral efficiency |
|---|---|---|---|
| 2 | 2 | 308 | 0.6016 |
| 4 | 2 | 602 | 1.1758 |
| 6 | 4 | 434 | 1.6953 |
| 8 | 4 | 553 | 2.1602 |
| 10 | 4 | 658 | 2.5703 |
| 27 | 8 | 948 | 7.4063 |

Further, the existing MCS entries in the current NR 256QAM MCS table, that is, Table 2, may be reduced according to the foregoing MCS table design principle (2), principle (3), or principle (4), and the determined reduced MCS entries may be shown in the following Table 1-6.

TABLE 1-6

| MCS index $I_{MCS}$ | Modulation order $Q_m$ | Target coding rate R × [1024] | Spectral efficiency |
|---|---|---|---|
| 5 | 4 | 378 | 1.4766 |
| 7 | 4 | 490 | 1.9141 |
| 9 | 4 | 616 | 2.4063 |
| 12 | 6 | 517 | 3.0293 |
| 14 | 6 | 616 | 3.6094 |
| 27 | 8 | 948 | 7.4063 |

Based on the foregoing Table 1-3 to Table 1-6, the designed 5-bit MCS table may be shown in the following Table 10, Table 11, or Table 12.

TABLE 10

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |
| 18 | 8 | 797 | 6.2266 |
| 19 | 8 | 841 | 6.5703 |

TABLE 10-continued

| MCS index $I_{MCS}$ | Modulation order $Q_m$ | Target coding rate R × [1024] | Spectral efficiency |
|---|---|---|---|
| 20 | 8 | 885 | 6.9141 |
| 21 | 8 | 916.5 | 7.1602 |
| 22 | 10 | 758/758.5/759 | 7.4023/7.4072/7.4121 |
| 23 | 10 | 805/805.5/806 | 7.8613/7.8662/7.8711 |
| 24 | 10 | 853 | 8.3301 |
| 25 | 10 | 900/900.5/901 | 8.7891/8.7939/8.7988 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 11

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 517 | 3.0293 |
| 8 | 6 | 567 | 3.3223 |
| 9 | 6 | 616 | 3.6094 |
| 10 | 6 | 666 | 3.9023 |
| 11 | 6 | 719 | 4.2129 |
| 12 | 6 | 772 | 4.5234 |
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 10 | 758/758.5/759 | 7.4023/7.4072/7.4121 |
| 23 | 10 | 805/805.5/806 | 7.8613/7.8662/7.8711 |
| 24 | 10 | 853 | 8.3301 |
| 25 | 10 | 900/900.5/901 | 8.7891/8.7939/8.7988 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 12

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 719 | 4.2129 |
| 12 | 6 | 772 | 4.5234 |

TABLE 12-continued

| MCS index $I_{MCS}$ | Modulation order $Q_m$ | Target coding rate R × [1024] | Spectral efficiency |
|---|---|---|---|
| 13 | 6 | 822 | 4.8164 |
| 14 | 6 | 873 | 5.1152 |
| 15 | 8 | 682.5 | 5.332 |
| 16 | 8 | 711 | 5.5547 |
| 17 | 8 | 754 | 5.8906 |
| 18 | 8 | 797 | 6.2266 |
| 19 | 8 | 841 | 6.5703 |
| 20 | 8 | 885 | 6.9141 |
| 21 | 8 | 916.5 | 7.1602 |
| 22 | 10 | 758/758.5/759 | 7.4023/7.4072/7.4121 |
| 23 | 10 | 805/805.5/806 | 7.8613/7.8662/7.8711 |
| 24 | 10 | 853 | 8.3301 |
| 25 | 10 | 900/900.5/901 | 8.7891/8.7939/8.7988 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

Embodiment 2

In Embodiment 2, corresponding to the foregoing scheme 3, when an NR 1024QAM MCS table is designed based on the foregoing NR 1024QAM CQI table, that is, Table 9, added MCS entries {20, 21, 22, 23, 24, 25, 26, 31} may be determined according to the foregoing MCS table design principles and the 256QAM MCS table defined in the current NR system, that is, the foregoing Table 2, as shown in the following Table 2-1.

TABLE 2-1

| MCS index $I_{MCS}$ | Modulation order $Q_m$ | Target coding rate R × [1024] | Spectral efficiency |
|---|---|---|---|
| 20 | 10 | 758/758.5/759 | 7.4023/7.4072/7.4121 |
| 21 | 10 | 789/789.5/790/790.5/791 | 7.7051/7.71/7.7148/7.7197/7.7246 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 31 | 10 | reserved | reserved |

MCS entry 31 in Table 2-1 may be used for retransmission.

MCS entry 20, MCS entry 23, and MCS entry 26 in Table 2-1 are obtained according to the foregoing MCS table design principle (1) with reference to the foregoing NR 1024QAM CQI table, that is, CQI entry 13, CQI entry 14, and CQI entry 15 in Table 9.

MCS entry 21 and MCS entry 22 in Table 2-1 are obtained by interpolating MCS entry 20 and MCS entry 23 according to the foregoing MCS table design principle (2), principle (3), or principle (4). A specific value of the coding rate is determined according to the foregoing MCS table design principle (5) and principle (7), and a specific value of spectral efficiency is determined according to the foregoing MCS table design principle (6) and principle (7).

MCS entry 24 and MCS entry 25 in Table 2-1 are obtained by interpolating MCS entry 23 and MCS entry 26 according to the foregoing MCS table design principle (2), principle (3), or principle (4). A specific value of the coding rate is determined according to the foregoing MCS table design principle (5) and principle (7), and a specific value of spectral efficiency is determined according to the foregoing MCS table design principle (6) and principle (7).

Further, because the number of added MCS entries is 8, the existing MCS entries in the current NR 256QAM MCS table, that is, Table 2, may be reduced according to the foregoing MCS table design principle (1) and principle (2), or principle (3), or principle (4), and determined reduced MCS entries may be shown in the following Table 2-2 or Table 2-2.

TABLE 2-2

| MCS index $I_{MCS}$ | Modulation order $Q_m$ | Target coding rate R × [1024] | Spectral efficiency |
|---|---|---|---|
| 6 | 4 | 434 | 1.6953 |
| 8 | 4 | 553 | 2.1602 |
| 10 | 4 | 658 | 2.5703 |
| 12 | 6 | 517 | 3.0293 |
| 14 | 6 | 616 | 3.6094 |
| 16 | 6 | 719 | 4.2129 |
| 18 | 6 | 822 | 4.8164 |
| 27 | 8 | 948 | 7.4063 |

TABLE 2-3

| MCS index $I_{MCS}$ | Modulation order $Q_m$ | Target coding rate R × [1024] | Spectral efficiency |
|---|---|---|---|
| 2 | 2 | 308 | 0.6016 |
| 4 | 2 | 602 | 1.1758 |
| 6 | 4 | 434 | 1.6953 |
| 8 | 4 | 553 | 2.1602 |
| 10 | 4 | 658 | 2.5703 |
| 12 | 6 | 517 | 3.0293 |
| 14 | 6 | 616 | 3.6094 |
| 27 | 8 | 948 | 7.4063 |

Further, the existing MCS entries in the current NR 256QAM MCS table, that is, Table 2, may be reduced according to the foregoing MCS table design principle (2), principle (3), or principle (4), and determined reduced MCS entries may be shown in the following Table 2-4 or Table 2-5.

TABLE 2-4

| MCS index $I_{MCS}$ | Modulation order $Q_m$ | Target coding rate R × [1024] | Spectral efficiency |
|---|---|---|---|
| 1 | 2 | 193 | 0.3770 |
| 3 | 2 | 449 | 0.8770 |
| 5 | 4 | 378 | 1.4766 |
| 7 | 4 | 490 | 1.9141 |
| 9 | 4 | 616 | 2.4063 |
| 12 | 6 | 517 | 3.0293 |
| 14 | 6 | 616 | 3.6094 |
| 27 | 8 | 948 | 7.4063 |

TABLE 2-5

| MCS index $I_{MCS}$ | Modulation order $Q_m$ | Target coding rate R × [1024] | Spectral efficiency |
|---|---|---|---|
| 5 | 4 | 378 | 1.4766 |
| 7 | 4 | 490 | 1.9141 |

TABLE 2-5-continued

| MCS index $I_{MCS}$ | Modulation order $Q_m$ | Target coding rate R × [1024] | Spectral efficiency |
|---|---|---|---|
| 9 | 4 | 616 | 2.4063 |
| 12 | 6 | 517 | 3.0293 |
| 14 | 6 | 616 | 3.6094 |
| 16 | 6 | 719 | 4.2129 |
| 18 | 6 | 822 | 4.8164 |
| 27 | 8 | 948 | 7.4063 |

Based on the foregoing Table 2-1 to Table 2-5, the designed 5-bit MCS table may be shown in the following Table 14, Table 15, or Table 16.

TABLE 13

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 772 | 4.5234 |
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 28 | 8 | 885 | 6.9141 |
| 19 | 8 | 916.5 | 7.1602 |
| 20 | 10 | 758/758.5/759 | 7.4023/7.4072/7.4121 |
| 21 | 10 | 789/789.5/790/ 790.5/791 | 7.7051/7.71/7.7148/ 7.7197/7.7246 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

TABLE 14

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 719 | 4.2129 |
| 10 | 6 | 772 | 4.5234 |
| 11 | 6 | 822 | 4.8164 |
| 12 | 6 | 873 | 5.1152 |
| 13 | 8 | 682.5 | 5.332 |
| 14 | 8 | 711 | 5.5547 |

TABLE 14-continued

| MCS index $I_{MCS}$ | Modulation order $Q_m$ | Target coding rate R × [1024] | Spectral efficiency |
|---|---|---|---|
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 10 | 758/758.5/759 | 7.4023/7.4072/7.4121 |
| 21 | 10 | 789/789.5/790/ 790.5/791 | 7.7051/7.71/7.7148/ 7.7197/7.7246 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

TABLE 15

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 308 | 0.6016 |
| 2 | 2 | 602 | 1.1758 |
| 3 | 4 | 434 | 1.6953 |
| 4 | 4 | 553 | 2.1602 |
| 5 | 4 | 658 | 2.5703 |
| 6 | 6 | 466 | 2.7305 |
| 7 | 6 | 567 | 3.3223 |
| 8 | 6 | 666 | 3.9023 |
| 9 | 6 | 719 | 4.2129 |
| 10 | 6 | 772 | 4.5234 |
| 11 | 6 | 822 | 4.8164 |
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 10 | 758/758.5/759 | 7.4023/7.4072/7.4121 |
| 21 | 10 | 789/789.5/790/ 790.5/791 | 7.7051/7.71/7.7148/ 7.7197/7.7246 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

TABLE 16

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 434 | 1.6953 |

TABLE 16-continued

| MCS index $I_{MCS}$ | Modulation order $Q_m$ | Target coding rate R × [1024] | Spectral efficiency |
|---|---|---|---|
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 772 | 4.5234 |
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 10 | 758/758.5/759 | 7.4023/7.4072/7.4121 |
| 21 | 10 | 789/789.5/790/ 790.5/791 | 7.7051/7.71/7.7148/ 7.7197/7.7246 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

Embodiment 3

In Embodiment 3, corresponding to the foregoing scheme 1, based on the NR 1024QAM CQI table defined in Embodiment 1, that is, Table 9, a CQI entry with a modulation mode of 1024QAM, a target coding rate of 758/758.5/759, and spectral efficiency of 7.4023/7.4072/7.4121 in Table 9 is replaced with a CQI entry with a modulation mode of 256QAM, a target coding rate of 948, and spectral efficiency of 7.4063, as shown in the following table 17.

TABLE 17

| CQI index | Modulation | Coding rate × 1024 | Efficiency |
|---|---|---|---|
| 0 | | out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 616 | 2.4063 |
| 6 | 64QAM | 567 | 3.3223 |
| 7 | 64QAM | 666 | 3.9023 |
| 8 | 64QAM | 772 | 4.5234 |
| 9 | 64QAM | 873 | 5.1152 |
| 10 | 256QAM | 711 | 5.5547 |
| 11 | 256QAM | 797 | 6.2266 |
| 12 | 256QAM | 885 | 6.9141 |
| 13 | 256QAM | 948 | 7.4063 |
| 14 | 1024QAM | 853 | 8.3301 |
| 15 | 1024QAM | 948 | 9.2578 |

Further, when an NR 1024QAM MCS table is designed based on the foregoing NR 1024QAM CQI table, that is, Table 17, added MCS entries {21, 22, 23, 24, 25, 26, 31} may be determined according to the foregoing MCS table design principles and the 256QAM MCS table defined in the current NR system, that is, the foregoing Table 2, as shown in the following Table 3-1.

TABLE 3-1

| MCS index $I_{MCS}$ | Modulation order $Q_m$ | Target coding rate R × [1024] | Spectral efficiency |
|---|---|---|---|
| 20 | 8 | 948 | 7.4063 |
| 21 | 10 | 789/789.5/790 | 7.7051/7.71/7.7148 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 31 | 10 | reserved | reserved |

MCS entry 31 in Table 3-1 may be used for retransmission.

MCS entry 23 and MCS entry 26 in Table 3-1 are obtained according to the foregoing MCS table design principle (1) with reference to the foregoing NR 1024QAM CQI table, that is, CQI entry 14 and CQI entry 15 in Table 9.

MCS entry 21 and MCS entry 22 in Table 3-1 are obtained by interpolating MCS entry 20 and MCS entry 23 according to the foregoing MCS table design principle (2), principle (3), or principle (4). A specific value of the coding rate is determined according to the foregoing MCS table design principle (5) and principle (7), and a specific value of spectral efficiency is determined according to the foregoing MCS table design principle (6) and principle (7).

MCS entry 24 and MCS entry 25 in Table 3-1 are obtained by interpolating MCS entry 23 and MCS entry 26 according to the foregoing MCS table design principle (2), principle (3), or principle (4). A specific value of the coding rate is determined according to the foregoing MCS table design principle (5) and principle (7), and a specific value of spectral efficiency is determined according to the foregoing MCS table design principle (6) and principle (7).

Further, because the number of added MCS entries is 7, the existing MCS entries in the current NR 256QAM MCS table, that is, Table 2, may be reduced according to the foregoing MCS table design principle (1) and principle (2), or principle (3), or principle (4), and determined reduced MCS entries may be shown in the following Table 3-2 or Table 3-3.

TABLE 3-2

| MCS index $I_{MCS}$ | Modulation order $Q_m$ | Target coding rate R × [1024] | Spectral efficiency |
|---|---|---|---|
| 6 | 4 | 434 | 1.6953 |
| 8 | 4 | 553 | 2.1602 |
| 10 | 4 | 658 | 2.5703 |
| 12 | 6 | 517 | 3.0293 |
| 14 | 6 | 616 | 3.6094 |
| 16 | 6 | 719 | 4.2129 |
| 18 | 6 | 822 | 4.8164 |

TABLE 3-3

| MCS index $I_{MCS}$ | Modulation order $Q_m$ | Target coding rate R × [1024] | Spectral efficiency |
|---|---|---|---|
| 2 | 2 | 308 | 0.6016 |
| 4 | 2 | 602 | 1.1758 |
| 6 | 4 | 434 | 1.6953 |

TABLE 3-3-continued

| MCS index $I_{MCS}$ | Modulation order $Q_m$ | Target coding rate R × [1024] | Spectral efficiency |
|---|---|---|---|
| 8 | 4 | 553 | 2.1602 |
| 10 | 4 | 658 | 2.5703 |
| 12 | 6 | 517 | 3.0293 |
| 14 | 6 | 616 | 3.6094 |

Further, the existing MCS entries in the current NR 256QAM MCS table, that is, Table 2, may be reduced according to the foregoing MCS table design principle (2), principle (3), or principle (4), and determined reduced MCS entries may be shown in the following Table 3-4 or Table 3-5.

TABLE 3-4

| MCS index $I_{MCS}$ | Modulation order $Q_m$ | Target coding rate R × [1024] | Spectral efficiency |
|---|---|---|---|
| 1 | 2 | 193 | 0.3770 |
| 3 | 2 | 449 | 0.8770 |
| 5 | 4 | 378 | 1.4766 |
| 7 | 4 | 490 | 1.9141 |
| 9 | 4 | 616 | 2.4063 |
| 12 | 6 | 517 | 3.0293 |
| 14 | 6 | 616 | 3.6094 |

TABLE 3-5

| MCS index $I_{MCS}$ | Modulation order $Q_m$ | Target coding rate R × [1024] | Spectral efficiency |
|---|---|---|---|
| 5 | 4 | 378 | 1.4766 |
| 7 | 4 | 490 | 1.9141 |
| 9 | 4 | 616 | 2.4063 |
| 12 | 6 | 517 | 3.0293 |
| 14 | 6 | 616 | 3.6094 |
| 16 | 6 | 719 | 4.2129 |
| 18 | 6 | 822 | 4.8164 |

Based on the foregoing Table 3-1 to Table 3-5, the designed 5-bit MCS table may be shown in the following Table 18, Table 19, Table 20, or Table 21.

TABLE 18

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 378 | 1.4766 |
| 6 | 4 | 490 | 1.9141 |
| 7 | 4 | 616 | 2.4063 |
| 8 | 6 | 466 | 2.7305 |
| 9 | 6 | 567 | 3.3223 |
| 10 | 6 | 666 | 3.9023 |
| 11 | 6 | 772 | 4.5234 |
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 28 | 8 | 885 | 6.9141 |

TABLE 18-continued

| MCS index $I_{MCS}$ | Modulation order $Q_m$ | Target coding rate R × [1024] | Spectral efficiency |
|---|---|---|---|
| 19 | 8 | 916.5 | 7.1602 |
| 20 | 8 | 948 | 7.4063 |
| 21 | 10 | 789/789.5/790 | 7.7051/7.71/7.7148 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 19

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 719 | 4.2129 |
| 10 | 6 | 772 | 4.5234 |
| 11 | 6 | 822 | 4.8164 |
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 8 | 948 | 7.4063 |
| 21 | 10 | 789/789.5/790 | 7.7051/7.71/7.7148 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 20

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 308 | 0.6016 |
| 2 | 2 | 602 | 1.1758 |
| 3 | 4 | 434 | 1.6953 |
| 4 | 4 | 553 | 2.1602 |
| 5 | 4 | 658 | 2.5703 |
| 6 | 6 | 466 | 2.7305 |
| 7 | 6 | 567 | 3.3223 |
| 8 | 6 | 666 | 3.9023 |
| 9 | 6 | 719 | 4.2129 |
| 10 | 6 | 772 | 4.5234 |
| 11 | 6 | 822 | 4.8164 |

TABLE 20-continued

| MCS index $I_{MCS}$ | Modulation order $Q_m$ | Target coding rate R × [1024] | Spectral efficiency |
|---|---|---|---|
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 8 | 948 | 7.4063 |
| 21 | 10 | 789/789.5/790 | 7.7051/7.71/7.7148 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

TABLE 21

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 308 | 0.6016 |
| 3 | 2 | 449 | 0.877 |
| 4 | 2 | 602 | 1.1758 |
| 5 | 4 | 434 | 1.6953 |
| 6 | 4 | 553 | 2.1602 |
| 7 | 4 | 658 | 2.5703 |
| 8 | 6 | 466 | 2.7305 |
| 9 | 6 | 567 | 3.3223 |
| 10 | 6 | 666 | 3.9023 |
| 11 | 6 | 772 | 4.5234 |
| 12 | 6 | 873 | 5.1152 |
| 13 | 8 | 682.5 | 5.332 |
| 14 | 8 | 711 | 5.5547 |
| 15 | 8 | 754 | 5.8906 |
| 16 | 8 | 797 | 6.2266 |
| 17 | 8 | 841 | 6.5703 |
| 18 | 8 | 885 | 6.9141 |
| 19 | 8 | 916.5 | 7.1602 |
| 20 | 8 | 948 | 7.4063 |
| 21 | 10 | 789/789.5/790 | 7.7051/7.71/7.7148 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

Embodiment 4

In Embodiment 4, corresponding to the foregoing scheme 4, added CQI entries {12, 14} are determined based on the NR 1024QAM CQI table defined in Embodiment 1, that is, Table 9, and with reference to the foregoing CQI table design principles, as shown in the following Table 4-1.

TABLE 4-1

| CQI index | Modulation | Coding rate × 1024 | Efficiency |
|---|---|---|---|
| 11 | 1024QAM | 758/758.5/759 | 7.4023/7.4072/7.4121 |
| 12 | 1024QAM | 805/805.5/806 | 7.8613/7.8662/7.8711 |
| 13 | 1024QAM | 853 | 8.3301 |
| 14 | 1024QAM | 900/900.5/901 | 8.7891/8.7939/8.7988 |
| 15 | 1024QAM | 948 | 9.2578 |

CQI entry 12 in Table 4-1 is obtained by interpolating CQI entry 11 and CQI entry 13 according to the foregoing CQI table design principle (1), principle (2), or principle (3). A specific value of the coding rate is determined according to the foregoing CQI table design principle (4) and principle (6), and a specific value of spectral efficiency is determined according to the foregoing CQI table design principle (5) and principle (6).

CQI entry 14 in Table 4-1 is obtained by interpolating CQI entry 13 and CQI entry 15 according to the foregoing CQI table design principle (1), principle (2), or principle (3). A specific value of the coding rate is determined according to the foregoing CQI table design principle (4) and principle (6), and a specific value of spectral efficiency is determined according to the foregoing CQI table design principle (5) and principle (6).

Further, based on the NR 1024QAM CQI table defined in Embodiment 1, that is, Table 9, the number of added CQI entries is 2, and reduced CQI entries determined with reference to the foregoing CQI table design principle (1) principle (2), or principle (3) may be shown in the following Table 4-2 or Table 4-3.

TABLE 4-2

| CQI index | Modulation | Coding rate × 1024 | Efficiency |
|---|---|---|---|
| 7 | 64QAM | 666 | 3.9023 |
| 9 | 64QAM | 873 | 5.1152 |

TABLE 4-3

| CQI index | Modulation | Coding rate × 1024 | Efficiency |
|---|---|---|---|
| 2 | QPSK | 193 | 0.3770 |
| 7 | 64QAM | 666 | 3.9023 |

The finally obtained NR 1024QAM CQI table may be shown in the following Table 22 or Table 23.

TABLE 22

| CQI index | Modulation | Coding rate × 1024 | Efficiency |
|---|---|---|---|
| 0 | | out of range | |
| 1 | QPSK | 78 | 0.1523 |
| 2 | QPSK | 193 | 0.377 |
| 3 | QPSK | 449 | 0.877 |
| 4 | 16QAM | 378 | 1.4766 |
| 5 | 16QAM | 616 | 2.4063 |
| 6 | 64QAM | 567 | 3.3223 |
| 7 | 64QAM | 772 | 4.5234 |
| 8 | 256QAM | 711 | 5.5547 |
| 9 | 256QAM | 797 | 6.2266 |
| 10 | 256QAM | 885 | 6.9141 |
| 11 | 1024QAM | 758/758.5/759 | 7.4023/7.4072/7.4121 |
| 12 | 1024QAM | 805/805.5/806 | 7.8613/7.8662/7.8711 |
| 13 | 1024QAM | 853 | 8.3301 |
| 14 | 1024QAM | 900/900.5/901 | 8.7891/8.7939/8.7988 |
| 15 | 1024QAM | 948 | 9.2578 |

TABLE 23

| CQI index | Modulation | Coding rate × 1024 | Efficiency |
|---|---|---|---|
| 0 | | out of range | |
| 1 | QPSK | 78 | 0.1523 |
| 2 | QPSK | 449 | 0.877 |
| 3 | 16QAM | 378 | 1.4766 |
| 4 | 16QAM | 616 | 2.4063 |
| 5 | 64QAM | 567 | 3.3223 |
| 6 | 64QAM | 772 | 4.5234 |
| 7 | 64QAM | 873 | 5.1152 |
| 8 | 256QAM | 711 | 5.5547 |
| 9 | 256QAM | 797 | 6.2266 |
| 10 | 256QAM | 885 | 6.9141 |
| 11 | 1024QAM | 758/758.5/759 | 7.4023/7.4072/7.4121 |

TABLE 23-continued

| CQI index | Modulation | Coding rate × 1024 | Efficiency |
|---|---|---|---|
| 12 | 1024QAM | 805/805.5/806 | 7.8613/7.8662/7.8711 |
| 13 | 1024QAM | 853 | 8.3301 |
| 14 | 1024QAM | 900/900.5/901 | 8.7891/8.7939/8.7988 |
| 15 | 1024QAM | 948 | 9.2578 |

Further, when an NR 1024QAM MCS table is designed based on the foregoing NR 1024QAM CQI tables, that is, Table 22 and Table 23, added MCS entries (referring to Embodiment 1) and reduced MCS entries (referring to Embodiment 1) may be determined according to the foregoing MCS table design principle and the 256QAM MCS table defined in the current NR system, that is, Table 2, to finally obtain designed 5-bit MCS tables shown in the following Table 24 and Table 25.

TABLE 24

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 193 | 0.377 |
| 2 | 2 | 449 | 0.877 |
| 3 | 4 | 378 | 1.4766 |
| 4 | 4 | 490 | 1.9141 |
| 5 | 4 | 616 | 2.4063 |
| 6 | 6 | 466 | 2.7305 |
| 7 | 6 | 567 | 3.3223 |
| 8 | 6 | 666 | 3.9023 |
| 9 | 6 | 772 | 4.5234 |
| 10 | 6 | 873 | 5.1152 |
| 11 | 8 | 682.5 | 5.332 |
| 12 | 8 | 711 | 5.5547 |
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 10 | 758/758.5/759 | 7.4023/7.4072/7.4121 |
| 19 | 10 | 781/781.5/782/782.5/783 | 7.627/7.6318/7.6367/7.6416/7.6465 |
| 20 | 10 | 805/805.5/806 | 7.8613/7.8662/7.8711 |
| 21 | 10 | 828/828.5/829/829.5/830 | 8.0859/8.0908/8.0957/8.1006/8.1055 |
| 22 | 10 | 853 | 8.3301 |
| 23 | 10 | 876/876.5/877 | 8.5547/8.5596/8.5645 |
| 24 | 10 | 900/900.5/901 | 8.7891/8.7939/8.7988 |
| 25 | 10 | 924/924.5/925 | 9.0234/9.0283/9.0332 |
| 26 | 10 | 948 | 9.2578 |
| 27 | 2 | reserved | |
| 28 | 4 | reserved | |
| 29 | 6 | reserved | |
| 30 | 8 | reserved | |
| 31 | 10 | reserved | |

TABLE 25

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 308 | 0.6016 |
| 2 | 2 | 602 | 1.1758 |
| 3 | 4 | 434 | 1.6953 |
| 4 | 4 | 553 | 2.1602 |
| 5 | 4 | 658 | 2.5703 |
| 6 | 6 | 466 | 2.7305 |
| 7 | 6 | 567 | 3.3223 |
| 8 | 6 | 666 | 3.9023 |
| 9 | 6 | 772 | 4.5234 |
| 10 | 6 | 873 | 5.1152 |
| 11 | 8 | 682.5 | 5.332 |
| 12 | 8 | 711 | 5.5547 |

TABLE 25-continued

| MCS index $I_{MCS}$ | Modulation order $Q_m$ | Target coding rate R × [1024] | Spectral efficiency |
|---|---|---|---|
| 13 | 8 | 754 | 5.8906 |
| 14 | 8 | 797 | 6.2266 |
| 15 | 8 | 841 | 6.5703 |
| 16 | 8 | 885 | 6.9141 |
| 17 | 8 | 916.5 | 7.1602 |
| 18 | 10 | 758/758.5/759 | 7.4023/7.4072/7.4121 |
| 19 | 10 | 781/781.5/782/782.5/783 | 7.627/7.6318/7.6367/7.6416/7.6465 |
| 20 | 10 | 805/805.5/806 | 7.8613/7.8662/7.8711 |
| 21 | 10 | 828/828.5/829/829.5/830 | 8.0859/8.0908/8.0957/8.1006/8.1055 |
| 22 | 10 | 853 | 8.3301 |
| 23 | 10 | 876/876.5/877 | 8.5547/8.5596/8.5645 |
| 24 | 10 | 900/900.5/901 | 8.7891/8.7939/8.7988 |
| 25 | 10 | 924/924.5/925 | 9.0234/9.0283/9.0332 |
| 26 | 10 | 948 | 9.2578 |
| 27 | 2 | | reserved |
| 28 | 4 | | reserved |
| 29 | 6 | | reserved |
| 30 | 8 | | reserved |
| 31 | 10 | | reserved |

Embodiment 5

In Embodiment 5, corresponding to the foregoing scheme 5, a 6-bit NR 1024QAM MCS table is designed based on the NR 1024QAM CQI table defined in Embodiment 1, that is, Table 9, or based on the NR 1024QAM CQI table in Embodiment 4, that is, Table 17, and with reference to the foregoing MCS table design principle and the 64QAM MCS table defined in the current NR system, such as Table 1, and the 256QAM MCS table, such as Table 2.

Optionally, referring to the foregoing Embodiment 2 or Embodiment 4, added MCS entries may be shown in the following Table 5-1 or Table 5-2.

TABLE 5-1

| MCS index $I_{MCS}$ | Modulation order $Q_m$ | Target coding rate R × [1024] | Spectral efficiency |
|---|---|---|---|
| 20 | 10 | 758/758.5/759 | 7.4023/7.4072/7.4121 |
| 21 | 10 | 789/789.5/790/790.5/791 | 7.7051/7.71/7.7148/7.7197/7.7246 |
| 22 | 10 | 821/821.5/822 | 8.0176/8.0225/8.0273 |
| 23 | 10 | 853 | 8.3301 |
| 24 | 10 | 884/884.5/885 | 8.6328/8.6377/8.6426 |
| 25 | 10 | 916/916.5/917 | 8.9453/8.9502/8.9551 |
| 26 | 10 | 948 | 9.2578 |
| 31 | 10 | reserved | reserved |

TABLE 5-2

| MCS index $I_{MCS}$ | Modulation order $Q_m$ | Target coding rate R × [1024] | Spectral efficiency |
|---|---|---|---|
| 18 | 10 | 758/758.5/759 | 7.4023/7.4072/7.4121 |
| 19 | 10 | 781/781.5/782/782.5/783 | 7.627/7.6318/7.6367/7.6416/7.6465 |
| 20 | 10 | 805/805.5/806 | 7.8613/7.8662/7.8711 |
| 21 | 10 | 828/828.5/829/829.5/830 | 8.0859/8.0908/8.0957/8.1006/8.1055 |
| 22 | 10 | 853 | 8.3301 |
| 23 | 10 | 876/876.5/877 | 8.5547/8.5596/8.5645 |
| 24 | 10 | 900/900.5/901 | 8.7891/8.7939/8.7988 |
| 25 | 10 | 924/924.5/925 | 9.0234/9.0283/9.0332 |
| 26 | 10 | 948 | 9.2578 |
| 31 | 10 | reserved | reserved |

Further, remaining MCS entries may be obtained based on the 64QAM MCS table defined in the NR system, such as Table 1, and the 256QAM MCS table, such as Table 2. A reduced MCS entry is an MCS entry corresponding to an MCS index 28 in the 64QAM MCS table, as shown in the following Table 5-3.

TABLE 5-3

| MCS index $I_{MCS}$ | Modulation order $Q_m$ | Target coding rate R × [1024] | Spectral efficiency |
|---|---|---|---|
| 28 | 6 | 948 | 5.5547 |

Finally obtained 6-bit NR 1024QAM MCS tables may be shown in the following Table 26 and Table 27. MCS entries whose modulation order, target coding rate, and spectral efficiency values are not provided are reserved MCS entries, and specific values of the modulation order, target coding rate, and spectral efficiency thereof are not limited in this embodiment.

TABLE 26

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 8 | 682.5 | 5.3320 |
| 29 | 8 | 711 | 5.5547 |
| 30 | 8 | 754 | 5.8906 |
| 31 | 8 | 797 | 6.2266 |
| 32 | 8 | 841 | 6.5703 |
| 33 | 8 | 885 | 6.9141 |
| 34 | 8 | 916.5 | 7.1602 |
| 35 | 8 | 948 | 7.4063 |
| 36 | 10 | 758/758.5/759 | 7.4023/7.4072/7.4121 |
| 37 | 10 | 789/789.5/790/790.5/791 | 7.7051/7.71/7.7148/7.7197/7.7246 |
| 38 | 10 | 821/821.5/822 | 8.0176/8.0225/8.0273 |
| 39 | 10 | 853 | 8.3301 |
| 40 | 10 | 884/884.5/885 | 8.6328/8.6377/8.6426 |
| 41 | 10 | 916/916.5/917 | 8.9453/8.9502/8.9551 |
| 42 | 10 | 948 | 9.2578 |
| 43 | — | — | — |
| 44 | — | — | — |
| 45 | — | — | — |
| 46 | — | — | — |
| 47 | — | — | — |
| 48 | — | — | — |

TABLE 26-continued

| MCS index $I_{MCS}$ | Modulation order $Q_m$ | Target coding rate R × [1024] | Spectral efficiency |
|---|---|---|---|
| 49 | — | — | — |
| 50 | — | — | — |
| 51 | — | — | — |
| 52 | — | — | — |
| 53 | — | — | — |
| 54 | — | — | — |
| 55 | — | — | — |
| 56 | — | — | — |
| 57 | — | — | — |
| 58 | — | — | — |
| 59 | 2 | | reserved |
| 60 | 4 | | reserved |
| 61 | 6 | | reserved |
| 62 | 8 | | reserved |
| 63 | 10 | | reserved |

TABLE 27

| MCS index $I_{MCS}$ | Modulation order $Q_m$ | Target coding rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 8 | 682.5 | 5.3320 |
| 29 | 8 | 711 | 5.5547 |
| 30 | 8 | 754 | 5.8906 |
| 31 | 8 | 797 | 6.2266 |
| 32 | 8 | 841 | 6.5703 |
| 33 | 8 | 885 | 6.9141 |
| 34 | 8 | 916.5 | 7.1602 |
| 35 | 8 | 948 | 7.4063 |
| 36 | 10 | 758/758.5/759 | 7.4023/7.4072/7.4121 |
| 37 | 10 | 781/781.5/782/782.5/783 | 7.627/7.6318/7.6367/7.6416/7.6465 |
| 38 | 10 | 805/805.5/806 | 7.8613/7.8662/7.8711 |
| 39 | 10 | 828/828.5/829/829.5/830 | 8.0859/8.0908/8.0957/8.1006/8.1055 |
| 40 | 10 | 853 | 8.3301 |
| 41 | 10 | 876/876.5/877 | 8.5547/8.5596/8.5645 |
| 42 | 10 | 900/900.5/901 | 8.7891/8.7939/8.7988 |
| 43 | 10 | 924/924.5/925 | 9.0234/9.0283/9.0332 |
| 44 | 10 | 948 | 9.2578 |
| 45 | — | — | — |
| 46 | — | — | — |
| 47 | — | — | — |
| 48 | — | — | — |
| 49 | — | — | — |
| 50 | — | — | — |

TABLE 27-continued

| MCS index $I_{MCS}$ | Modulation order $Q_m$ | Target coding rate R × [1024] | Spectral efficiency |
|---|---|---|---|
| 51 | — | — | — |
| 52 | — | — | — |
| 53 | — | — | — |
| 54 | — | — | — |
| 55 | — | — | — |
| 56 | — | — | — |
| 57 | — | — | — |
| 58 | — | — | — |
| 59 | 2 | | reserved |
| 60 | 4 | | reserved |
| 61 | 6 | | reserved |
| 62 | 8 | | reserved |
| 63 | 10 | | reserved |

Figure 3:
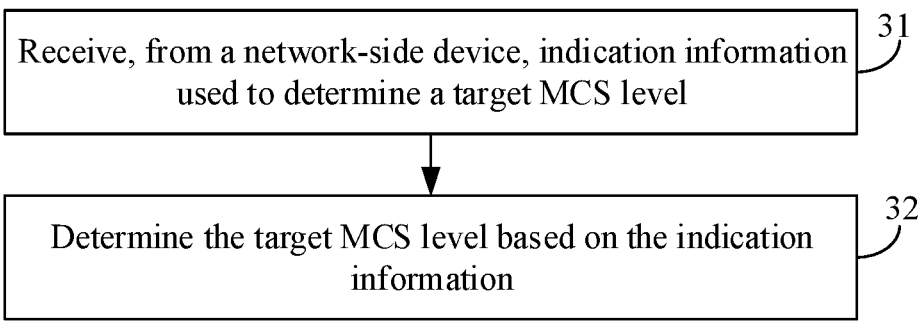
FIG. 3 is a flowchart of an information reception method according to an embodiment of this application.

FIG. 3 is a flowchart of an information reception method according to an embodiment of this application. The method is performed by a terminal. As shown in FIG. 3, the method includes the following steps.

Step 31: Receive, from a network-side device, indication information used to determine a target MCS level.

The target MCS level is an MCS level in a first MCS table, and the first MCS table includes an MCS level corresponding to 1024QAM.

Optionally, the first MCS table includes at least an MCS index corresponding to a modulation mode of a modulation order 10, that is, 1024QAM, and a corresponding coding rate and spectral efficiency, and each MCS index uniquely corresponds to one MCS level.

Step 32: Determine the target MCS level based on the indication information.

In an implementation, the network-side device such as a base station may determine, based on the first MCS table, the target MCS level corresponding to transmission of the terminal, such as an MCS level corresponding to a channel scheduled for the terminal, and notify the terminal, to instruct the terminal to determine, based on the MCS level, the modulation mode and coding rate to be used for the channel scheduled for the terminal.

In this embodiment of this application, the terminal may receive, from the network-side device, the indication information used to determine the target MCS level, where the target MCS level is the MCS level in the first MCS table, and the first MCS table includes the MCS level corresponding to 1024QAM; and determine the target MCS level based on the indication information. This enables the corresponding communications system to support 1024QAM. Therefore, in comparison with the prior art, higher-order modulation is supported, and a throughput limitation problem in an application scenario with a high signal-to-noise ratio is resolved.

Optionally, the method further includes:

the terminal sends a target CQI to the network-side device, where the target CQI is a CQI in a first CQI table, and the first CQI table includes a CQI level corresponding to 1024QAM.

Optionally, the method further includes:

the terminal receives first indication information from the network-side device, where the first indication information is used to indicate a first MCS table to be used by the terminal; and the first indication information is sent by using RRC signaling.

Optionally, the method further includes:

the terminal receives second indication information and third indication information from the network-side device, where the second indication information is used to indicate at least two first MCS tables configured for the terminal; and the third indication information is used to indicate a first MCS table to be selected from the at least two first MCS tables for use by the terminal; and the second indication information is sent by using RRC signaling; and the third indication information is sent by using a MAC CE or DCI.

Optionally, the method further includes:

the terminal receives fourth indication information from the network-side device, where the fourth indication information is used to indicate a first CQI table to be used by the terminal for CQI feedback; and the fourth indication information is sent by using RRC signaling.

Optionally, the method further includes:

the terminal receives fifth indication information and sixth indication information from the network-side device, where the fifth indication information is used to indicate at least two first CQI tables configured for the terminal; and the sixth indication information is used to indicate a first CQI table to be selected from the at least two first CQI tables for CQI feedback by the terminal; the fifth indication information is sent by using RRC signaling; and the sixth indication information is sent by using a MAC CE or DCI.

It should be noted that for specific forms of the first MCS table and the first CQI table in this embodiment of this application, reference may be made to the foregoing embodiment in FIG. 2. Details are not described herein again.

It should be noted that the information transmission method provided in this embodiment of this application may be performed by an information transmission apparatus or a control module for performing the information transmission method in the information transmission apparatus. An information transmission apparatus provided in an embodiment of this application is described by assuming that the information transmission method in this embodiment of this application is performed by the information transmission apparatus.

Figure 4:
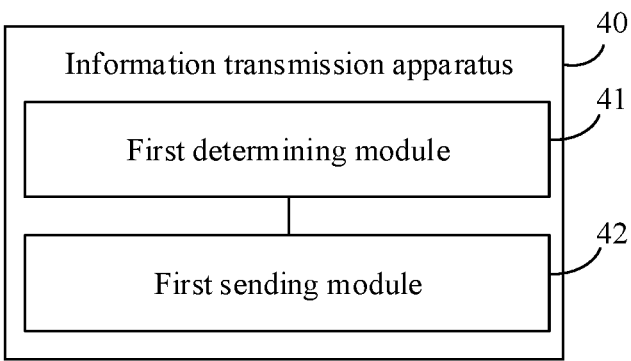
FIG. 4 is a schematic diagram of a structure of an information transmission apparatus according to an embodiment of this application.

FIG. 4 is a schematic diagram of a structure of an information transmission apparatus according to an embodiment of this application. The apparatus is applied to a network-side device. As shown in FIG. 4, the information transmission apparatus 40 includes:

a first determining module 41, configured to determine a target MCS level corresponding to transmission of a terminal, where the target MCS level is an MCS level in a first MCS table, and the first MCS table includes an MCS level corresponding to 1024QAM; and a first sending module 42, configured to send, to the terminal, indication information used to determine the target MCS level.

Optionally, the information transmission apparatus 40 further includes:

a first receiving module, configured to receive a target CQI from the terminal, where the target CQI is a CQI in a first CQI table, and the first CQI table includes a CQI level corresponding to 1024QAM.

Optionally, the first MCS table is determined according to at least one of the following design principles:

reserving an existing coding rate and spectral efficiency in an existing 1024QAM CQI table;

ensuring equal spectral efficiency intervals;

ensuring equal coding rate intervals;

ensuring equal signal-to-noise ratio intervals;

in presence of a decimal fraction in a coding rate, using a first algorithm to process the coding rate;

in a case of retaining four decimal places in spectral efficiency, using a rounding algorithm to process the spectral efficiency; and a relationship between spectral efficiency and a target coding rate satisfying the following equation: spectral efficiency=target coding rate/1024*modulation order.

Optionally, the first CQI table is determined according to at least one of the following design principles:

ensuring equal spectral efficiency intervals;

ensuring equal coding rate intervals;

ensuring equal signal-to-noise ratio intervals;

in presence of a decimal fraction in a coding rate, using a first algorithm to process the coding rate;

in a case of retaining four decimal places in spectral efficiency, using a rounding algorithm to process the spectral efficiency; and a relationship between spectral efficiency and a target coding rate satisfying the following equation: spectral efficiency=target coding rate/1024*modulation order.

Optionally, the first algorithm includes any one of the following:

rounding up, rounding down, rounding off, and retaining one decimal place.

Optionally, the first CQI table includes at least one of the following corresponding to 1024QAM: a first CQI level, a second CQI level, and a third CQI level, where a target coding rate corresponding to the first CQI level is any one of the following: 758, 758.5, and 759; and spectral efficiency corresponding to the first CQI level is any one of the following: 7.4023, 7.4072, and 7.4121;

a target coding rate corresponding to the second CQI level is 853; and spectral efficiency corresponding to the second CQI level is 8.3301; and a target coding rate corresponding to the third CQI level is 948; and spectral efficiency corresponding to the third CQI level is 9.2578.

Optionally, a CQI level not included in the first CQI table includes at least one of the following: a fourth CQI level corresponding to 16QAM, a fifth CQI level corresponding to 64QAM, and a sixth CQI level corresponding to 256QAM, where a target coding rate corresponding to the fourth CQI level is 490; and spectral efficiency corresponding to the fourth CQI level is 1.9141;

a target coding rate corresponding to the fifth CQI level is 466; and spectral efficiency corresponding to the fifth CQI level is 2.7305; and a target coding rate corresponding to the sixth CQI level is 948; and spectral efficiency corresponding to the sixth CQI level is 7.4063.

Optionally, the first MCS table includes at least one of the following corresponding to 1024QAM: a first MCS level, a second MCS level, a third MCS level, a fourth MCS level, a fifth MCS level, and a sixth MCS level, where a target coding rate corresponding to the first MCS level is any one of the following: 758, 758.5, and 759; and spectral efficiency corresponding to the first MCS level is any one of the following: 7.4023, 7.4072, and 7.4121;

a target coding rate corresponding to the second MCS level is any one of the following: 805, 805.5, and 806; and spectral efficiency corresponding to the second MCS level is any one of the following: 7.8613, 7.8662, and 7.8711;

a target coding rate corresponding to the third MCS level is 853; and spectral efficiency corresponding to the third MCS level is 8.3301;

a target coding rate corresponding to the fourth MCS level is any one of the following: 900, 900.5, and 901; and spectral efficiency corresponding to the fourth MCS level is any one of the following: 8.7891, 8.7939, and 8.7988;

a target coding rate corresponding to the fifth MCS level is 948; and spectral efficiency corresponding to the fifth MCS level is 9.2578; and a target coding rate corresponding to the sixth MCS level is reserved; and spectral efficiency corresponding to the sixth MCS level is reserved.

Optionally, an MCS level not included in the first MCS table includes at least one of the following: a seventh MCS level, an eighth MCS level, a ninth MCS level, a tenth MCS level, an eleventh MCS level, and a twelfth MCS level, where the seventh MCS level, the eighth MCS level, and the ninth MCS level correspond to 16QAM; the tenth MCS level and the eleventh MCS level correspond to 64QAM; and the twelfth MCS level corresponds to 256QAM;

a target coding rate corresponding to the seventh MCS level is 434; and spectral efficiency corresponding to the seventh MCS level is 1.6953;

a target coding rate corresponding to the eighth MCS level is 553; and spectral efficiency corresponding to the eighth MCS level is 2.1602;

a target coding rate corresponding to the ninth MCS level is 658; and spectral efficiency corresponding to the ninth MCS level is 2.5703;

a target coding rate corresponding to the tenth MCS level is 517; and spectral efficiency corresponding to the tenth MCS level is 3.0293;

a target coding rate corresponding to the eleventh MCS level is 616; and spectral efficiency corresponding to the eleventh MCS level is 3.6094; and a target coding rate corresponding to the twelfth MCS level is 948; and spectral efficiency corresponding to the twelfth MCS level is 7.4063.

Optionally, an MCS level not included in the first MCS table includes at least one of the following: a seventh MCS level, an eighth MCS level, a ninth MCS level, a tenth MCS level, an eleventh MCS level, and a twelfth MCS level, where the seventh MCS level and the eighth MCS level correspond to QPSK; the ninth MCS level, the tenth MCS level, and the eleventh MCS level correspond to 16QAM; and the twelfth MCS level corresponds to 256QAM;

a target coding rate corresponding to the seventh MCS level is 308; and spectral efficiency corresponding to the seventh MCS level is 0.6016;

a target coding rate corresponding to the eighth MCS level is 602; and spectral efficiency corresponding to the eighth MCS level is 1.1758;

a target coding rate corresponding to the ninth MCS level is 434; and spectral efficiency corresponding to the ninth MCS level is 1.6953;

a target coding rate corresponding to the tenth MCS level is 553; and spectral efficiency corresponding to the tenth MCS level is 2.1602;

a target coding rate corresponding to the eleventh MCS level is 658; and spectral efficiency corresponding to the eleventh MCS level is 2.5703; and a target coding rate corresponding to the twelfth MCS level is 948; and spectral efficiency corresponding to the twelfth MCS level is 7.4063.

Optionally, an MCS level not included in the first MCS table includes at least one of the following: a seventh MCS level, an eighth MCS level, a ninth MCS level, a tenth MCS level, an eleventh MCS level, and a twelfth MCS level, where the seventh MCS level, the eighth MCS level, and the ninth MCS level correspond to 16QAM; the tenth MCS level and the eleventh MCS level correspond to 64QAM; and the twelfth MCS level corresponds to 256QAM;

a target coding rate corresponding to the seventh MCS level is 378; and spectral efficiency corresponding to the seventh MCS level is 1.4766;

a target coding rate corresponding to the eighth MCS level is 490; and spectral efficiency corresponding to the eighth MCS level is 1.9141;

a target coding rate corresponding to the ninth MCS level is 616; and spectral efficiency corresponding to the ninth MCS level is 2.4063;

a target coding rate corresponding to the tenth MCS level is 517; and spectral efficiency corresponding to the tenth MCS level is 3.0293;

a target coding rate corresponding to the eleventh MCS level is 616; and spectral efficiency corresponding to the eleventh MCS level is 3.6094; and a target coding rate corresponding to the twelfth MCS level is 948; and spectral efficiency corresponding to the twelfth MCS level is 7.4063.

Optionally, the first MCS table includes at least one of the following corresponding to 1024QAM: a thirteenth MCS level, a fourteenth MCS level, a fifteenth MCS level, a sixteenth MCS level, a seventeenth MCS level, an eighteenth MCS level, a nineteenth MCS level, and a twentieth MCS level, where a target coding rate corresponding to the thirteenth MCS level is any one of the following: 758, 758.5, and 759; and spectral efficiency corresponding to the thirteenth MCS level is any one of the following: 7.4023, 7.4072, and 7.4121;

a target coding rate corresponding to the fourteenth MCS level is any one of the following: 789, 789.5, 790, 790.5, and 791; and spectral efficiency corresponding to the fourteenth MCS level is any one of the following: 7.7051, 7.71, 7.7148, 7.7197, and 7.7246;

a target coding rate corresponding to the fifteenth MCS level is any one of the following: 821, 821.5, and 822; and spectral efficiency corresponding to the fifteenth MCS level is any one of the following: 8.0176, 8.0225, and 8.0273;

a target coding rate corresponding to the sixteenth MCS level is 853; and spectral efficiency corresponding to the sixteenth MCS level is 8.3301;

a target coding rate corresponding to the seventeenth MCS level is any one of the following: 884, 884.5, and 885; and spectral efficiency corresponding to the seventeenth MCS level is any one of the following: 8.6328, 8.6377, and 8.6426;

a target coding rate corresponding to the eighteenth MCS level is any one of the following: 916, 916.5, and 917; and spectral efficiency corresponding to the eighteenth MCS level is any one of the following: 8.9453, 8.9502, and 8.9551;

a target coding rate corresponding to the nineteenth MCS level is 948; and spectral efficiency corresponding to the nineteenth MCS level is 9.2578; and a target coding rate corresponding to the twentieth MCS level is reserved; and spectral efficiency corresponding to the twentieth MCS level is reserved.

Optionally, an MCS level not included in the first MCS table includes at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, where the twenty-first MCS level, the twenty-second MCS level, and the twenty-third MCS level correspond to 16QAM; the twenty-fourth MCS level, the twenty-fifth MCS level, the twenty-sixth MCS level, and the twenty-seventh MCS level correspond to 64QAM; and the twenty-eighth MCS level corresponds to 256QAM;

a target coding rate corresponding to the twenty-first MCS level is 434; and spectral efficiency corresponding to the twenty-first MCS level is 1.6953;

a target coding rate corresponding to the twenty-second MCS level is 553; and spectral efficiency corresponding to the twenty-second MCS level is 2.1602;

a target coding rate corresponding to the twenty-third MCS level is 658; and spectral efficiency corresponding to the twenty-third MCS level is 2.5703;

a target coding rate corresponding to the twenty-fourth MCS level is 517; and spectral efficiency corresponding to the twenty-fourth MCS level is 3.0293;

a target coding rate corresponding to the twenty-fifth MCS level is 616; and spectral efficiency corresponding to the twenty-fifth MCS level is 3.6094;

a target coding rate corresponding to the twenty-sixth MCS level is 719; and spectral efficiency corresponding to the twenty-sixth MCS level is 4.2129;

a target coding rate corresponding to the twenty-seventh MCS level is 822; and spectral efficiency corresponding to the twenty-seventh MCS level is 4.8164; and a target coding rate corresponding to the twenty-eighth MCS level is 948; and spectral efficiency corresponding to the twenty-eighth MCS level is 7.4063.

Optionally, an MCS level not included in the first MCS table includes at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, where the twenty-first MCS level and the twenty-second MCS level correspond to QPSK; the twenty-third MCS level, the twenty-fourth MCS level, and the twenty-fifth MCS level correspond to 16QAM; the twenty-sixth MCS level and the twenty-seventh MCS level correspond to 64QAM; and the twenty-eighth MCS level corresponds to 256QAM;

a target coding rate corresponding to the twenty-first MCS level is 308; and spectral efficiency corresponding to the twenty-first MCS level is 0.6016;

a target coding rate corresponding to the twenty-second MCS level is 602; and spectral efficiency corresponding to the twenty-second MCS level is 1.1758;

a target coding rate corresponding to the twenty-third MCS level is 434; and spectral efficiency corresponding to the twenty-third MCS level is 1.6953;

a target coding rate corresponding to the twenty-fourth MCS level is 553; and spectral efficiency corresponding to the twenty-fourth MCS level is 2.1602;

a target coding rate corresponding to the twenty-fifth MCS level is 658; and spectral efficiency corresponding to the twenty-fifth MCS level is 2.5703;

a target coding rate corresponding to the twenty-sixth MCS level is 517; and spectral efficiency corresponding to the twenty-sixth MCS level is 3.0293;

a target coding rate corresponding to the twenty-seventh MCS level is 616; and spectral efficiency corresponding to the twenty-seventh MCS level is 3.6094; and a target coding rate corresponding to the twenty-eighth MCS level is 948; and spectral efficiency corresponding to the twenty-eighth MCS level is 7.4063.

Optionally, an MCS level not included in the first MCS table includes at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, where the twenty-first MCS level and the twenty-second MCS level correspond to QPSK; the twenty-third MCS level, the twenty-fourth MCS level, and the twenty-fifth MCS level correspond to 16QAM; the twenty-sixth MCS level and the twenty-seventh MCS level correspond to 64QAM; and the twenty-eighth MCS level corresponds to 256QAM;

a target coding rate corresponding to the twenty-first MCS level is 193; and spectral efficiency corresponding to the twenty-first MCS level is 0.3770;

a target coding rate corresponding to the twenty-second MCS level is 449; and spectral efficiency corresponding to the twenty-second MCS level is 0.8770;

a target coding rate corresponding to the twenty-third MCS level is 378; and spectral efficiency corresponding to the twenty-third MCS level is 1.4766;

a target coding rate corresponding to the twenty-fourth MCS level is 490; and spectral efficiency corresponding to the twenty-fourth MCS level is 1.9141;

a target coding rate corresponding to the twenty-fifth MCS level is 616; and spectral efficiency corresponding to the twenty-fifth MCS level is 2.4063;

a target coding rate corresponding to the twenty-sixth MCS level is 517; and spectral efficiency corresponding to the twenty-sixth MCS level is 3.0293;

a target coding rate corresponding to the twenty-seventh MCS level is 616; and spectral efficiency corresponding to the twenty-seventh MCS level is 3.6094; and a target coding rate corresponding to the twenty-eighth MCS level is 948; and spectral efficiency corresponding to the twenty-eighth MCS level is 7.4063.

Optionally, an MCS level not included in the first MCS table includes at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, where the twenty-first MCS level, the twenty-second MCS level, and the twenty-third MCS level correspond to 16QAM; the twenty-fourth MCS level, the twenty-fifth MCS level, the twenty-sixth MCS level, and the twenty-seventh MCS level correspond to 64QAM; and the twenty-eighth MCS level corresponds to 256QAM;

a target coding rate corresponding to the twenty-first MCS level is 378; and spectral efficiency corresponding to the twenty-first MCS level is 1.4766;

a target coding rate corresponding to the twenty-second MCS level is 490; and spectral efficiency corresponding to the twenty-second MCS level is 1.9141;

a target coding rate corresponding to the twenty-third MCS level is 616; and spectral efficiency corresponding to the twenty-third MCS level is 2.4063;

a target coding rate corresponding to the twenty-fourth MCS level is 517; and spectral efficiency corresponding to the twenty-fourth MCS level is 3.0293;

a target coding rate corresponding to the twenty-fifth MCS level is 616; and spectral efficiency corresponding to the twenty-fifth MCS level is 3.6094;

a target coding rate corresponding to the twenty-sixth MCS level is 719; and spectral efficiency corresponding to the twenty-sixth MCS level is 4.2129;

a target coding rate corresponding to the twenty-seventh MCS level is 822; and spectral efficiency corresponding to the twenty-seventh MCS level is 4.8164; and a target coding rate corresponding to the twenty-eighth MCS level is 948; and spectral efficiency corresponding to the twenty-eighth MCS level is 7.4063.

Optionally, the first CQI table further includes at least one of the following corresponding to 1024QAM: a seventh CQI level and an eighth CQI level, where a target coding rate corresponding to the seventh CQI level is any one of the following: 805, 805.5, and 806; and spectral efficiency corresponding to the seventh CQI level is any one of the following: 7.8613, 7.8662, and 7.8711; and a target coding rate corresponding to the eighth CQI level is any one of the following: 900, 900.5, and 901; and spectral efficiency corresponding to the eighth CQI level is any one of the following: 8.7891, 8.7939, and 8.7988.

Optionally, a CQI level not included in the first CQI table includes at least one of the following: a ninth CQI level and a tenth CQI level, where the ninth CQI level and the tenth CQI level correspond to 64QAM;

a target coding rate corresponding to the ninth CQI level is 666; and spectral efficiency corresponding to the ninth CQI level is 3.9023; and a target coding rate corresponding to the tenth CQI level is 873; and spectral efficiency corresponding to the tenth CQI level is 5.1152.

Optionally, a CQI level not included in the first CQI table includes at least one of the following: a ninth CQI level and a tenth CQI level, where the ninth CQI level corresponds to quadrature phase shift keying QPSK; and the tenth CQI level corresponds to 64QAM;

a target coding rate corresponding to the ninth CQI level is 193; and spectral efficiency corresponding to the ninth CQI level is 0.3770; and a target coding rate corresponding to the tenth CQI level is 666; and spectral efficiency corresponding to the tenth CQI level is 3.9023.

Optionally, the first MCS table includes at least one of the following corresponding to 1024QAM: a twenty-ninth MCS level, a thirtieth MCS level, a thirty-first MCS level, and a thirty-second MCS level, where a target coding rate corresponding to the twenty-ninth MCS level is any one of the following: 781, 781.5, 782, 782.5, and 783; and spectral efficiency corresponding to the twenty-ninth MCS level is any one of the following: 7.627, 7.6318, 7.6367, 7.6416, and 7.6465;

a target coding rate corresponding to the thirtieth MCS level is any one of the following: 828, 828.5, 829, 829.5, and 830; and spectral efficiency corresponding to the thirtieth MCS level is any one of the following: 8.0859, 8.0908, 8.0957, 8.1006, and 8.1055;

a target coding rate corresponding to the thirty-first MCS level is any one of the following: 876, 876.5, and 877; and spectral efficiency corresponding to the thirty-first MCS level is any one of the following: 8.5547, 8.5596, and 8.5645; and a target coding rate corresponding to the thirty-second MCS level is any one of the following: 924, 924.5, and 925; and spectral efficiency corresponding to the thirty-second MCS level is any one of the following: 9.0234, 9.0283, and 9.0332.

Optionally, an MCS level not included in the first MCS table includes a thirty-third MCS level corresponding to 64QAM, where a target coding rate corresponding to the thirty-third MCS level is 434; and spectral efficiency corresponding to the thirty-third MCS level is 1.6953.

Optionally, the information transmission apparatus 40 further includes:

a second sending module, configured to send first indication information to the terminal, where the first indication information is used to indicate a first MCS table to be used by the terminal; and the first indication information is sent by using RRC signaling.

Optionally, the information transmission apparatus 40 further includes:

a third sending module, configured to send second indication information and third indication information to the terminal, where the second indication information is used to indicate at least two first MCS tables configured for the terminal; and the third indication information is used to indicate a first MCS table to be selected from the at least two first MCS tables for use by the terminal; and the second indication information is sent by using RRC signaling; and the third indication information is sent by using a MAC CE or DCI.

Optionally, the information transmission apparatus 40 further includes:

a fourth sending module, configured to send fourth indication information to the terminal, where the fourth indication information is used to indicate a first CQI table to be used by the terminal for CQI feedback; and the fourth indication information is sent by using RRC signaling.

Optionally, the information transmission apparatus 40 further includes:

a fifth sending module, configured to send fifth indication information and sixth indication information to the terminal, where the fifth indication information is used to indicate at least two first CQI tables configured for the terminal; and the sixth indication information is used to indicate a first CQI table to be selected from the at least two first CQI tables for CQI feedback by the terminal; and the fifth indication information is sent by using RRC signaling; and the sixth indication information is sent by using a MAC CE or DCI.

It may be understood that the information transmission apparatus 40 provided in this embodiment of this application can implement each process implemented by the embodiment in FIG. 2, with the same technical effect achieved. To avoid repetition, details are not described herein again.

It should be noted that the information reception method provided in this embodiment of this application may be performed by an information reception apparatus or a control module for performing the information reception method in the information reception apparatus. An information reception apparatus provided in an embodiment of this application is described by assuming that the information reception method in this embodiment of this application is performed by the information reception apparatus.

Figure 5:
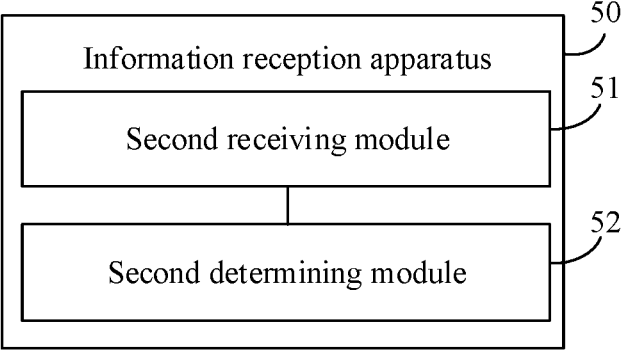
FIG. 5 is a schematic diagram of a structure of an information reception apparatus according to an embodiment of this application.

FIG. 5 is a schematic diagram of a structure of an information reception apparatus according to an embodiment of this application. The apparatus is applied to a terminal. As shown in FIG. 5, the information reception apparatus 50 includes:

a second receiving module 51, configured to receive, from a network-side device, indication information used to determine a target MCS level, where the target MCS level is an MCS level in a first MCS table, and the first MCS table includes an MCS level corresponding to 1024QAM; and a second determining module 52, configured to determine the target MCS level based on the indication information.

Optionally, the information reception apparatus 50 further includes:

a sixth sending module, configured to send a target CQI to the network-side device, where the target CQI is a CQI in a first CQI table, and the first CQI table includes a CQI level corresponding to 1024QAM.

Optionally, the information reception apparatus 50 further includes:

a third receiving module, configured to receive first indication information from the network-side device, where the first indication information is used to indicate a first MCS table to be used by the terminal; and the first indication information is sent by using RRC signaling.

Optionally, the information reception apparatus 50 further includes:

a fourth receiving module, configured to receive second indication information and third indication information from the network-side device, where the second indication information is used to indicate at least two first MCS tables configured for the terminal; and the third indication information is used to indicate a first MCS table to be selected from the at least two first MCS tables for use by the terminal; and the second indication information is sent by using RRC signaling; and the third indication information is sent by using a MAC CE or DCI.

Optionally, the information reception apparatus 50 further includes:

a fifth receiving module, configured to receive fourth indication information from the network-side device, where the fourth indication information is used to indicate a first CQI table to be used by the terminal for CQI feedback; and the fourth indication information is sent by using RRC signaling.

Optionally, the information reception apparatus 50 further includes:

a sixth receiving module, configured to receive fifth indication information and sixth indication information from the network-side device, where the fifth indication information is used to indicate at least two first CQI tables configured for the terminal; and the sixth indication information is used to indicate a first CQI table to be selected from the at least two first CQI tables for CQI feedback by the terminal; the fifth indication information is sent by using RRC signaling; and the sixth indication information is sent by using a MAC CE or DCI.

The information reception apparatus in this embodiment of this application may be a terminal or may be a component, an integrated circuit, or a chip in a terminal. The apparatus may be a mobile terminal or may be a non-mobile terminal. For example, the mobile terminal may include but is not limited to the foregoing illustrated type of the terminal 11. The non-mobile terminal may be a personal computer (PC), a television (TV), a teller machine, a self-service machine, or the like. This is not specifically limited in this embodiment of this application.

The information reception apparatus in this embodiment of this application may be an apparatus having an operating system. The operating system may be an Android operating system, an iOS operating system, or other possible operating systems, and is not specifically limited in this embodiment of this application.

It may be understood that the information reception apparatus 50 provided in this embodiment of this application can implement each process implemented by the embodiment in FIG. 3, with the same technical effect achieved. To avoid repetition, details are not described herein again.

Figures 6, 7:
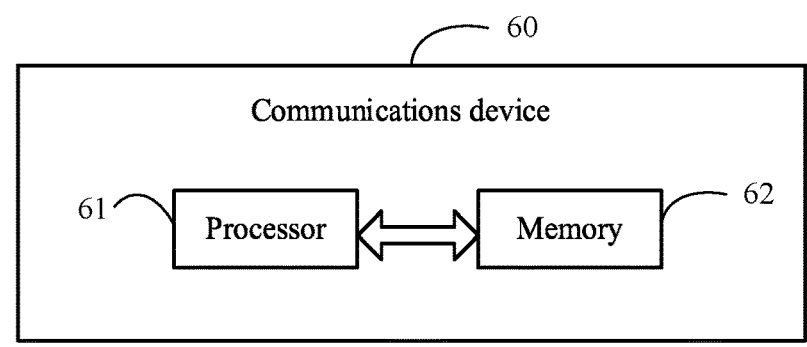
FIG. 6 is a schematic diagram of a structure of a communications device according to an embodiment of this application.
FIG. 7 is a schematic diagram of a structure of a terminal according to an embodiment of this application.

Optionally, as shown in FIG. 6, an embodiment of this application further provides a communications device 60, including a processor 61, a memory 62, and a program or instructions stored in the memory 62 and capable of running on the processor 61. For example, when the communications device 60 is a network-side device, and the program or instructions are executed by the processor 61, each process of the foregoing information transmission method embodiment is implemented, with the same technical effect achieved. When the communications device 60 is a terminal, and the program or instructions are executed by the processor 61, each process of the foregoing information reception method embodiment is implemented, with the same technical effect achieved. To avoid repetition, details are not described herein again.

FIG. 7 is a schematic diagram of a hardware structure of a terminal for implementing an embodiment of this application.

The terminal 700 includes but is not limited to components such as a radio frequency unit 701, a network module 702, an audio output unit 703, an input unit 704, a sensor

705, a display unit 706, a user input unit 707, an interface unit 708, a memory 709, and a processor 710.

A person skilled in the art may understand that the terminal 700 may further include a power supply (for example, a battery) supplying power to all components. The power supply may be logically connected to the processor 710 through a power management system. In this way, functions such as charge management, discharge management, and power consumption management are implemented by using the power management system. The terminal structure as shown in FIG. 7 does not constitute a limitation on the terminal. The terminal may include more or fewer components than those shown in the figure, or combine some components, or have components arranged differently. Details are not described herein again.

It should be understood that, in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a switch key), a trackball, a mouse, and a joystick. Details are not described herein again.

In this embodiment of this application, after receiving downlink data from a network-side device, the radio frequency unit 701 sends the downlink data to the processor 710 for processing, and in addition, sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may primarily include a program or instruction storage area and a data storage area. The program or instruction storage area may store an operating system, an application program or instructions (such as an audio play function and an image play function) required by at least one function, and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 710 may include one or more processing units. Optionally, the processor 710 may integrate an application processor and a modem processor. The application processor mainly processes the operating system, a user interface, an application program, or an instruction. The modem processor mainly processes wireless communication. For example, the modem processor is a baseband processor. It may be understood that the modem processor may alternatively not be integrated in the processor 710.

The radio frequency unit 701 is configured to receive, from the network-side device, indication information used to determine a target MCS level, where the target MCS level is an MCS level in a first MCS table, and the first MCS table includes an MCS level corresponding to 1024QAM; and the processor 710 is configured to determine the target MCS level based on the indication information.

Optionally, the radio frequency unit 701 is further configured to send a target CQI to the network-side device, where the target CQI is a CQI in a first CQI table, and the first CQI table includes a CQI level corresponding to 1024QAM.

It may be understood that the terminal 700 provided in this embodiment of this application can implement each process implemented by the embodiment in FIG. 3, with the same technical effect achieved. To avoid repetition, details are not described herein again.

Figure 8:
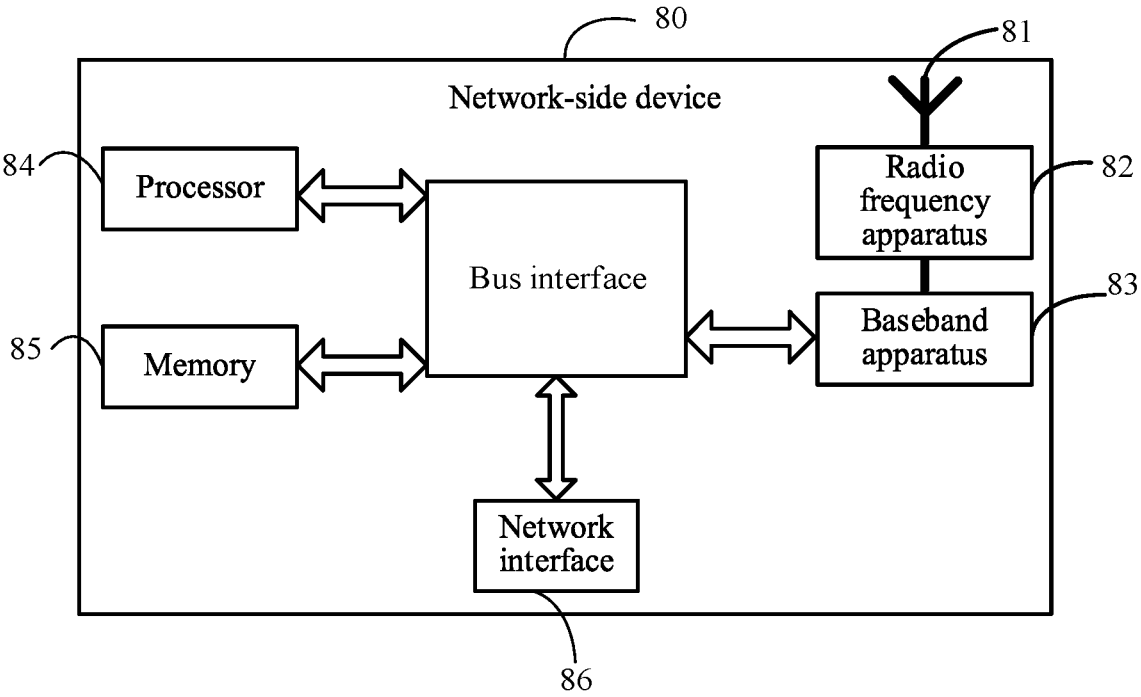
FIG. 8 is a schematic diagram of a structure of a network-side device according to an embodiment of this application.

Specifically, an embodiment of this application further provides a network-side device. As shown in FIG. 8, the network device 80 includes an antenna 81, a radio frequency apparatus 82, and a baseband apparatus 83. The antenna 81 is connected to the radio frequency apparatus 82. In an uplink direction, the radio frequency apparatus 82 receives information by using the antenna 81 and sends the received information to the baseband apparatus 83 for processing. In a downlink direction, the baseband apparatus 83 processes to-be-sent information, and sends the information to the radio frequency apparatus 82; and the radio frequency apparatus 82 processes the received information and then sends the information out by using the antenna 81.

The method performed by the network-side device in the foregoing embodiment may be implemented in the baseband apparatus 83, and the baseband apparatus 83 includes a processor 84 and a memory 85.

The baseband apparatus 83 may include, for example, at least one baseband processing unit, where a plurality of chips are disposed on the baseband processing unit. As shown in FIG. 8, one of the chips is, for example, the processor 84, connected to the memory 85, to invoke a program in the memory 85 to perform the operation of the network device shown in the foregoing method embodiment.

The baseband apparatus 83 may further include a network interface 86, configured to exchange information with the radio frequency apparatus 82, where the interface is, for example, a common public radio interface (CPRI for short).

Specifically, the network-side device in this embodiment of this application further includes a program or instructions stored in the memory 85 and capable of running on the processor 84. When the processor 84 invokes the program or instructions in the memory 85, the method performed by each module shown in FIG. 5 is performed, with the same technical effect achieved. To avoid repetition, details are not described herein again.

An embodiment of this application further provides a readable storage medium. The readable storage medium stores a program or instructions. When the program or instructions are executed by a processor, each process of the foregoing information transmission method embodiment is implemented, or each process of the foregoing information reception method embodiment is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this application provides a chip. The chip includes a processor and a communications interface. The communications interface is coupled to the processor. The processor is configured to run a program or instructions on a network-side device to implement each process of the foregoing information transmission method embodiment or implement each process of the foregoing information reception method embodiment, with the same technical effect achieved. To avoid repetition, details are not described herein again.

It should be understood that the chip provided in this embodiment of this application may also be referred to as a system-level chip, a system chip, a chip system, a system-on-chip, or the like.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this application is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform and certainly may alternatively be implemented by using hardware. However, in most cases, the former is a preferred implementation. Based on such an understanding, the technical solutions of this application essentially or the part contributing to the prior art may be implemented in a form of a software product. The computer software product is stored in a storage medium (such as a ROM/RAM, a magnetic disk, or an optical disc), and includes several instructions for enabling a terminal (which may be a mobile phone, a computer, a server, a network device, or the like) to perform the methods described in the embodiments of this application.

The embodiments of this application are described above with reference to the accompanying drawings. However, this application is not limited to the foregoing specific embodiments. The foregoing specific embodiments are merely illustrative rather than restrictive. Inspired by this application, a person of ordinary skill in the art can still derive a plurality of variations without departing from the essence of this application and the protection scope of the claims. All these variations shall fall within the protection scope of this application.

What is claimed is:

1. An information transmission method, performed by a network-side device, wherein the method comprises:

determining a target modulation and coding scheme MCS level corresponding to transmission of a terminal, wherein the target MCS level is an MCS level in a first MCS table, and the first MCS table comprises an MCS level corresponding to 1024 quadrature amplitude modulation QAM; and sending, to the terminal, indication information used to determine the target MCS level;

wherein the first MCS table comprises at least one of the following corresponding to 1024QAM: a second MCS level, a third MCS level, or a fourth MCS level, wherein a target coding rate corresponding to the second MCS level is 805.5; and spectral efficiency corresponding to the second MCS level is 7.8662;

a target coding rate corresponding to the third MCS level is 853; and spectral efficiency corresponding to the third MCS level is 8.3301; and a target coding rate corresponding to the fourth MCS level is 900.5; and spectral efficiency corresponding to the fourth MCS level is 8.7939.

2. The method according to claim 1, wherein the method further comprises:

receiving a target channel quality indicator CQI from the terminal, wherein the target CQI is a CQI in a first CQI table, and the first CQI table comprises a CQI level corresponding to 1024QAM.

3. The method according to claim 2, wherein the first CQI table is determined according to at least one of the following design principles:

ensuring equal spectral efficiency intervals;

ensuring equal coding rate intervals;

ensuring equal signal-to-noise ratio intervals;

in presence of a decimal fraction in a coding rate, using a first algorithm to process the coding rate;

in a case of retaining four decimal places in spectral efficiency, using a rounding algorithm to process the spectral efficiency; and a relationship between spectral efficiency and a target coding rate satisfying the following equation: spectral efficiency=target coding rate/1024*modulation order.

4. The method according to claim 2, wherein the first CQI table comprises at least one of the following corresponding to 1024QAM: a second CQI level, and a third CQI level, wherein a target coding rate corresponding to the second CQI level is 853; and spectral efficiency corresponding to the second CQI level is 8.3301; and a target coding rate corresponding to the third CQI level is 948; and spectral efficiency corresponding to the third CQI level is 9.2578.

5. The method according to claim 4, wherein a CQI level not comprised in the first CQI table comprises at least one of the following: a fourth CQI level corresponding to 16QAM, or a fifth CQI level corresponding to 64QAM, wherein a target coding rate corresponding to the fourth CQI level is 490; and spectral efficiency corresponding to the fourth CQI level is 1.9141; and a target coding rate corresponding to the fifth CQI level is 466; and spectral efficiency corresponding to the fifth CQI level is 2.7305.

6. The method according to claim 4, wherein the first CQI table further comprises at least one of the following corresponding to 1024QAM: a seventh CQI level and an eighth CQI level, wherein a target coding rate corresponding to the seventh CQI level is any one of the following: 805, 805.5, and 806; and spectral efficiency corresponding to the seventh CQI level is any one of the following: 7.8613, 7.8662, and 7.8711; and a target coding rate corresponding to the eighth CQI level is any one of the following: 900, 900.5, and 901; and spectral efficiency corresponding to the eighth CQI level is any one of the following: 8.7891, 8.7939, and 8.7988.

7. The method according to claim 2, wherein the method further comprises:

sending fourth indication information to the terminal, wherein the fourth indication information is used to indicate a first CQI table to be used by the terminal for CQI feedback; and the fourth indication information is sent by using RRC signaling; or sending fifth indication information and sixth indication information to the terminal, wherein the fifth indication information is used to indicate at least two first CQI tables configured for the terminal; and the sixth indication information is used to indicate a first CQI table to be selected from the at least two first CQI tables for CQI feedback by the terminal; and the fifth indication information is sent by using RRC signaling; and the sixth indication information is sent by using a MAC CE or DCI.

8. The method according to claim 1, wherein the first MCS table is determined according to at least one of the following design principles:

reserving an existing coding rate and spectral efficiency in an existing 1024QAM CQI table;

ensuring equal spectral efficiency intervals;

ensuring equal coding rate intervals;

ensuring equal signal-to-noise ratio intervals;

in presence of a decimal fraction in a coding rate, using a first algorithm to process the coding rate;

in a case of retaining four decimal places in spectral efficiency, using a rounding algorithm to process the spectral efficiency; and a relationship between spectral efficiency and a target coding rate satisfying the following equation: spectral efficiency=target coding rate/1024*modulation order.

9. The method according to claim 8, wherein the first algorithm comprises any one of the following:

rounding up, rounding down, rounding off, and retaining one decimal place.

10. The method according to claim 1, wherein the first MCS table further comprises at least one of the following corresponding to 1024QAM: a thirteenth MCS level, a fourteenth MCS level, a fifteenth MCS level, a sixteenth MCS level, a seventeenth MCS level, an eighteenth MCS level, a nineteenth MCS level, and a twentieth MCS level, wherein a target coding rate corresponding to the thirteenth MCS level is any one of the following: 758, 758.5, and 759; and spectral efficiency corresponding to the thirteenth MCS level is any one of the following: 7.4023, 7.4072, and 7.4121;

a target coding rate corresponding to the fourteenth MCS level is any one of the following: 789, 789.5, 790, 790.5, and 791; and spectral efficiency corresponding to the fourteenth MCS level is any one of the following: 7.7051, 7.71, 7.7148, 7.7197, and 7.7246;

a target coding rate corresponding to the fifteenth MCS level is any one of the following: 821, 821.5, and 822; and spectral efficiency corresponding to the fifteenth MCS level is any one of the following: 8.0176, 8.0225, and 8.0273;

a target coding rate corresponding to the sixteenth MCS level is 853; and spectral efficiency corresponding to the sixteenth MCS level is 8.3301;

a target coding rate corresponding to the seventeenth MCS level is any one of the following: 884, 884.5, and 885; and spectral efficiency corresponding to the seventeenth MCS level is any one of the following: 8.6328, 8.6377, and 8.6426;

a target coding rate corresponding to the eighteenth MCS level is any one of the following: 916, 916.5, and 917; and spectral efficiency corresponding to the eighteenth MCS level is any one of the following: 8.9453, 8.9502, and 8.9551;

a target coding rate corresponding to the nineteenth MCS level is 948; and spectral efficiency corresponding to the nineteenth MCS level is 9.2578; and a target coding rate corresponding to the twentieth MCS level is reserved; and spectral efficiency corresponding to the twentieth MCS level is reserved.

11. The method according to claim 10, wherein an MCS level not comprised in the first MCS table comprises at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, wherein the twenty-first MCS level, the twenty-second MCS level, and the twenty-third MCS level correspond to 16QAM; the twenty-fourth MCS level, the twenty-fifth MCS level, the twenty-sixth MCS level, and the twenty-seventh MCS level correspond to 64QAM; and the twenty-eighth MCS level corresponds to 256QAM;

a target coding rate corresponding to the twenty-first MCS level is 434; and spectral efficiency corresponding to the twenty-first MCS level is 1.6953;

a target coding rate corresponding to the twenty-second MCS level is 553; and spectral efficiency corresponding to the twenty-second MCS level is 2.1602;

a target coding rate corresponding to the twenty-third MCS level is 658; and spectral efficiency corresponding to the twenty-third MCS level is 2.5703;

a target coding rate corresponding to the twenty-fourth MCS level is 517; and spectral efficiency corresponding to the twenty-fourth MCS level is 3.0293;

a target coding rate corresponding to the twenty-fifth MCS level is 616; and spectral efficiency corresponding to the twenty-fifth MCS level is 3.6094;

a target coding rate corresponding to the twenty-sixth MCS level is 719; and spectral efficiency corresponding to the twenty-sixth MCS level is 4.2129;

a target coding rate corresponding to the twenty-seventh MCS level is 822; and spectral efficiency corresponding to the twenty-seventh MCS level is 4.8164; and a target coding rate corresponding to the twenty-eighth MCS level is 948; and spectral efficiency corresponding to the twenty-eighth MCS level is 7.4063;

or, wherein an MCS level not comprised in the first MCS table comprises at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, wherein the twenty-first MCS level and the twenty-second MCS level correspond to QPSK; the twenty-third MCS level, the twenty-fourth MCS level, and the twenty-fifth MCS level correspond to 16QAM; the twenty-sixth MCS level and the twenty-seventh MCS level correspond to 64QAM; and the twenty-eighth MCS level corresponds to 256QAM;

a target coding rate corresponding to the twenty-first MCS level is 308; and spectral efficiency corresponding to the twenty-first MCS level is 0.6016;

a target coding rate corresponding to the twenty-second MCS level is 602; and spectral efficiency corresponding to the twenty-second MCS level is 1.1758;

a target coding rate corresponding to the twenty-third MCS level is 434; and spectral efficiency corresponding to the twenty-third MCS level is 1.6953;

a target coding rate corresponding to the twenty-fourth MCS level is 553; and spectral efficiency corresponding to the twenty-fourth MCS level is 2.1602;

a target coding rate corresponding to the twenty-fifth MCS level is 658; and spectral efficiency corresponding to the twenty-fifth MCS level is 2.5703;

a target coding rate corresponding to the twenty-sixth MCS level is 517; and spectral efficiency corresponding to the twenty-sixth MCS level is 3.0293;

a target coding rate corresponding to the twenty-seventh MCS level is 616; and spectral efficiency corresponding to the twenty-seventh MCS level is 3.6094; and a target coding rate corresponding to the twenty-eighth MCS level is 948; and spectral efficiency corresponding to the twenty-eighth MCS level is 7.4063;

or, wherein an MCS level not comprised in the first MCS table comprises at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, wherein the twenty-first MCS level and the twenty-second MCS level correspond to QPSK; the twenty-third MCS level, the twenty-fourth MCS level, and the twenty-fifth MCS level correspond to 16QAM; the twenty-sixth MCS level and the twenty-seventh MCS level correspond to 64QAM; and the twenty-eighth MCS level corresponds to 256QAM;

a target coding rate corresponding to the twenty-first MCS level is 193; and spectral efficiency corresponding to the twenty-first MCS level is 0.3770;

a target coding rate corresponding to the twenty-second MCS level is 449; and spectral efficiency corresponding to the twenty-second MCS level is 0.8770;

a target coding rate corresponding to the twenty-third MCS level is 378; and spectral efficiency corresponding to the twenty-third MCS level is 1.4766;

a target coding rate corresponding to the twenty-fourth MCS level is 490; and spectral efficiency corresponding to the twenty-fourth MCS level is 1.9141;

a target coding rate corresponding to the twenty-fifth MCS level is 616; and spectral efficiency corresponding to the twenty-fifth MCS level is 2.4063;

57

58 a target coding rate corresponding to the twenty-sixth MCS level is 517; and spectral efficiency corresponding to the twenty-sixth MCS level is 3.0293;

a target coding rate corresponding to the twenty-seventh MCS level is 616; and spectral efficiency corresponding to the twenty-seventh MCS level is 3.6094; and a target coding rate corresponding to the twenty-eighth MCS level is 948; and spectral efficiency corresponding to the twenty-eighth MCS level is 7.4063;

or, wherein an MCS level not comprised in the first MCS table comprises at least one of the following: a twenty-first MCS level, a twenty-second MCS level, a twenty-third MCS level, a twenty-fourth MCS level, a twenty-fifth MCS level, a twenty-sixth MCS level, a twenty-seventh MCS level, and a twenty-eighth MCS level, wherein the twenty-first MCS level, the twenty-second MCS level, and the twenty-third MCS level correspond to 16QAM; the twenty-fourth MCS level, the twenty-fifth MCS level, the twenty-sixth MCS level, and the twenty-seventh MCS level correspond to 64QAM; and the twenty-eighth MCS level corresponds to 256QAM;

a target coding rate corresponding to the twenty-first MCS level is 378; and spectral efficiency corresponding to the twenty-first MCS level is 1.4766;

a target coding rate corresponding to the twenty-second MCS level is 490; and spectral efficiency corresponding to the twenty-second MCS level is 1.9141;

a target coding rate corresponding to the twenty-third MCS level is 616; and spectral efficiency corresponding to the twenty-third MCS level is 2.4063;

a target coding rate corresponding to the twenty-fourth MCS level is 517; and spectral efficiency corresponding to the twenty-fourth MCS level is 3.0293;

a target coding rate corresponding to the twenty-fifth MCS level is 616; and spectral efficiency corresponding to the twenty-fifth MCS level is 3.6094;

a target coding rate corresponding to the twenty-sixth MCS level is 719; and spectral efficiency corresponding to the twenty-sixth MCS level is 4.2129;

a target coding rate corresponding to the twenty-seventh MCS level is 822; and spectral efficiency corresponding to the twenty-seventh MCS level is 4.8164; and a target coding rate corresponding to the twenty-eighth MCS level is 948; and spectral efficiency corresponding to the twenty-eighth MCS level is 7.4063.

12. The method according to claim 1, wherein the first MCS table further comprises at least one of the following corresponding to 1024QAM: a fifth MCS level, or a sixth MCS level, wherein a target coding rate corresponding to the fifth MCS level is 948; and spectral efficiency corresponding to the fifth MCS level is 9.2578; and a target coding rate corresponding to the sixth MCS level is reserved; and spectral efficiency corresponding to the sixth MCS level is reserved.

13. The method according to claim 1, wherein the method further comprises:

sending first indication information to the terminal, wherein the first indication information is used to indicate a first MCS table to be used by the terminal; and the first indication information is sent by using radio resource control RRC signaling; or sending second indication information and third indication information to the terminal, wherein the second indication information is used to indicate at least two first MCS tables configured for the terminal; and the third indication information is used to indicate a first MCS table to be selected from the at least two first MCS tables for use by the terminal; and the second indication information is sent by using RRC signaling; and the third indication information is sent by using a media access control control element MAC CE or downlink control information DCI.

14. An information reception method, performed by a terminal, wherein the method comprises:

receiving, from a network-side device, indication information used to determine a target MCS level, wherein the target MCS level is an MCS level in a first MCS table, and the first MCS table comprises an MCS level corresponding to 1024QAM; and determining the target MCS level based on the indication information;

wherein the first MCS table comprises at least one of the following corresponding to 1024QAM: a second MCS level, a third MCS level, or a fourth MCS level, wherein a target coding rate corresponding to the second MCS level is 805.5; and spectral efficiency corresponding to the second MCS level is 7.8662;

a target coding rate corresponding to the third MCS level is 853; and spectral efficiency corresponding to the third MCS level is 8.3301; and a target coding rate corresponding to the fourth MCS level is 900.5; and spectral efficiency corresponding to the fourth MCS level is 8.7939.

15. The method according to claim 14, wherein the method further comprises:

sending a target CQI to the network-side device, wherein the target CQI is a CQI in a first CQI table, and the first CQI table comprises a CQI level corresponding to 1024QAM.

16. The method according to claim 15, wherein the first CQI table comprises at least one of the following corresponding to 1024QAM: a second CQI level, and a third CQI level, wherein a target coding rate corresponding to the second CQI level is 853; and spectral efficiency corresponding to the second CQI level is 8.3301; and a target coding rate corresponding to the third CQI level is 948; and spectral efficiency corresponding to the third CQI level is 9.2578.

17. The method according to claim 15, wherein the method further comprises:

receiving fourth indication information from the network-side device, wherein the fourth indication information is used to indicate a first CQI table to be used by the terminal for CQI feedback; and the fourth indication information is sent by using RRC signaling.

18. A terminal, comprising a processor, a memory, and a program or instructions stored in the memory and capable of running on the processor, wherein the program or instructions, when executed by the processor, causes the processor to implement the steps of the information reception method according to claim 14.

19. The method according to claim 14, wherein the first MCS table further comprises at least one of the following corresponding to 1024QAM: a fifth MCS level, or a sixth MCS level, wherein a target coding rate corresponding to the fifth MCS level is 948; and spectral efficiency corresponding to the fifth MCS level is 9.2578; and a target coding rate corresponding to the sixth MCS level
is reserved; and spectral efficiency corresponding to the
sixth MCS level is reserved.

20. A network-side device, comprising a processor, a
memory, and a program or instructions stored in the memory
and capable of running on the processor, wherein when the
program or instructions are executed by the processor, the
processor is configured to implement the following steps:

determining a target modulation and coding scheme MCS
level corresponding to transmission of a terminal,
wherein the target MCS level is an MCS level in a first
MCS table, and the first MCS table comprises an MCS
level corresponding to 1024 quadrature amplitude
modulation QAM; and sending, to the terminal, indication information used to
determine the target MCS level;

wherein the first MCS table comprises at least one of the
following corresponding to 1024QAM: a second MCS
level, a third MCS level, or a fourth MCS level,
wherein a target coding rate corresponding to the second MCS
level is 805.5; and spectral efficiency corresponding to
the second MCS level is 7.8662;

a target coding rate corresponding to the third MCS level
is 853; and spectral efficiency corresponding to the
third MCS level is 8.3301; and a target coding rate corresponding to the fourth MCS level
is 900.5; and spectral efficiency corresponding to the
fourth MCS level is 8.7939.

<p style="text-align:center">*    *    *    *    *</p>